United States Patent
Ujiie et al.

(10) Patent No.: US 11,356,475 B2
(45) Date of Patent: Jun. 7, 2022

(54) FRAME TRANSMISSION PREVENTION APPARATUS, FRAME TRANSMISSION PREVENTION METHOD, AND IN-VEHICLE NETWORK SYSTEM

(71) Applicant: Panasonic Intellectual Property Corporation of America, Torrance, CA (US)

(72) Inventors: Yoshihiro Ujiie, Osaka (JP); Jun Anzai, Kanagawa (JP); Hideki Matsushima, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 683 days.

(21) Appl. No.: 16/255,697

(22) Filed: Jan. 23, 2019

(65) Prior Publication Data

US 2019/0173912 A1 Jun. 6, 2019

Related U.S. Application Data

(63) Continuation of application No. PCT/JP2017/020558, filed on Jun. 2, 2017.

(30) Foreign Application Priority Data

Jul. 28, 2016 (JP) .............................. JP2016-148990
May 15, 2017 (JP) .............................. JP2017-096138

(51) Int. Cl.
*H04L 9/40* (2022.01)
*H04L 12/40* (2006.01)
*H04W 4/40* (2018.01)

(52) U.S. Cl.
CPC .......... *H04L 63/1466* (2013.01); *H04L 12/40* (2013.01); *H04L 12/40013* (2013.01);
(Continued)

(58) Field of Classification Search
CPC ................ H04L 63/1466; H04L 12/40; H04L 12/40013; H04L 12/40026; H04L 63/0227;
(Continued)

(56) References Cited

U.S. PATENT DOCUMENTS

| 2008/0186870 | A1* | 8/2008 | Butts .................. H04L 43/0847 370/252 |
| 2014/0036693 | A1* | 2/2014 | Mabuchi ............ H04L 43/0817 370/243 |
| 2015/0020152 | A1* | 1/2015 | Litichever .............. H04L 63/14 726/1 |

(Continued)

FOREIGN PATENT DOCUMENTS

| JP | 2014-146868 | 8/2014 |
| JP | 2014-236248 | 12/2014 |

(Continued)

OTHER PUBLICATIONS

Groll et al., Secure and Authentic Communication on Existing In-Vehicle Networks, Jun. 2009, IEEE Intelligent Vehicles Symposium, pp. 1093-1097 (Year: 2009).*

(Continued)

*Primary Examiner* — Kenneth W Chang
(74) *Attorney, Agent, or Firm* — Greenblum & Bernstein, P.L.C.

(57) ABSTRACT

A frame transmission prevention apparatus connected to a network of a network system including a plurality of electronic control units communicating with one another via the network is provided. The apparatus includes a processor and
(Continued)

a memory. The memory includes at least one set of instructions that causes the processor to perform processes when executed by the processor. The processes include receiving a first frame from the network and switching whether to perform a first process for preventing transmission of the first frame on the basis of management information indicating whether prevention of transmission of a frame is permitted if the first frame satisfies a first condition.

18 Claims, 18 Drawing Sheets

(52) U.S. Cl.
CPC .... *H04L 12/40026* (2013.01); *H04L 63/0227* (2013.01); *H04L 63/12* (2013.01); *H04L 63/1408* (2013.01); *H04W 4/40* (2018.02); *H04L 2012/40215* (2013.01); *H04L 2012/40273* (2013.01)

(58) Field of Classification Search
CPC ................. H04L 63/12; H04L 63/1408; H04L 2012/40215; H04L 2012/40273; H04W 4/40
See application file for complete search history.

(56) References Cited

U.S. PATENT DOCUMENTS

| | | | |
|---|---|---|---|
| 2015/0082380 A1* | 3/2015 | Nairn | H04L 63/1466 726/2 |
| 2015/0089236 A1* | 3/2015 | Han | H04W 12/10 713/181 |
| 2015/0095711 A1* | 4/2015 | Elend | G06F 13/4072 714/39 |
| 2015/0358351 A1 | 12/2015 | Otsuka et al. | |
| 2016/0323287 A1 | 11/2016 | Kishikawa et al. | |
| 2017/0147812 A1 | 5/2017 | Ujiie et al. | |

FOREIGN PATENT DOCUMENTS

| | | |
|---|---|---|
| JP | 2016-134913 | 7/2016 |
| JP | 2016-134914 | 7/2016 |

OTHER PUBLICATIONS

International Search Report of PCT application No. PCT/JP2017/020558 dated Aug. 15, 2017.
Tsutomu Matsumoto et al., "A Method of Preventing Unauthorized Data Transmission in Controller Area Network", IEEE 75th Vehicular Technology Conference, May 6-9, 2012.

* cited by examiner

FIG. 6

| ID | DATA |
|---|---|
| 1 | 0 |
| 1 | 1 |
| 1 | 2 |
| 1 | 3 |
| 1 | 4 |
| ... | ... |

FIG. 7

| ID | DATA |
|---|---|
| 2 | 100 |
| 2 | 90 |
| 2 | 80 |
| 2 | 70 |
| 2 | 60 |
| ... | ... |

FIG. 8

| ID | DATA |
|---|---|
| 3 | 1 |
| 3 | 1 |
| 3 | 0 |
| 3 | 0 |
| 3 | 0 |
| ... | ... |

FIG. 9

| ID | DATA |
|---|---|
| 4 | 0 |
| 4 | 10 |
| 4 | 20 |
| 4 | 30 |
| 4 | 40 |
| ... | ... |

FIG. 11

| ID |
|---|
| 1 |
| 2 |
| 3 |
| 4 |

FIG. 12

| MANAGEMENT INFORMATION |
|---|
| 0 (FLAG INFORMATION FOR ID "1") |
| 0 (FLAG INFORMATION FOR ID "2") |
| 0 (FLAG INFORMATION FOR ID "3") |
| 0 (FLAG INFORMATION FOR ID "4") |
| 1 (FLAG INFORMATION FOR ID "5") |
| 0 (FLAG INFORMATION FOR ID "6") |
| ⋮ |

FRAME TRANSMISSION PREVENTION APPARATUS, FRAME TRANSMISSION PREVENTION METHOD, AND IN-VEHICLE NETWORK SYSTEM

BACKGROUND

1. Technical Field

The present disclosure relates to a security measure technique for preventing transmission of an anomalous frame to a network of an in-vehicle network system or the like.

2. Description of the Related Art

In recent years, a plurality of devices called electronic control units (ECUs) have been disposed in a system of an automobile. A network connecting these ECUs to one another is referred to as an in-vehicle network. There are many communication standards for in-vehicle networks. One of the most mainstream in-vehicle networks among them is a standard called CAN (Controller Area Network) described by ISO 11898.

According to CAN, the communication path is a bus built with two wires, and an ECU connected to the bus is called a node. Each of the nodes connected to the bus transmits and receives a frame called a "data frame". A transmitting node that transmits a data frame applies a voltage to the two wires and generate a potential difference between the wires. Thus, the transmitting node transmits a value of "1" called "recessive" or a value of "0" called "dominant". When multiple transmitting nodes transmit recessive and dominant at exactly the same time, the dominant has priority and is transmitted. If the format of a received data frame is anomalous, the receiving node transmits a frame called an error frame. An error frame consists of 6 consecutive dominant bits transmitted and is used to notify the transmitting node and the other receiving node of the occurrence of anomaly of the data frame.

In addition, in CAN, there are no identifiers indicating a destination address and a transmission address, and the transmitting node adds an identifier (ID) to each of the data frames, and each of the receiving nodes receives only a data frame with a predetermined ID. In addition, CAN adopts the CSMA/CA (Carrier Sense Multiple Access/Collision Avoidance) scheme. Arbitration is performed by using the ID when a plurality of nodes transmit data at the same time, and the data frame with a smaller ID value is transmitted preferentially.

The in-vehicle network system faces a threat to anomalous control over an ECU by an attacker who accesses the bus and transmits an attack frame, such as an anomalous frame. Accordingly, security measures are being planned.

For example, Japanese Unexamined Patent Application Publication No. 2014-146868 describes a technique for preventing transmission of an anomalous frame by discarding each of two frames having the same identifier if the two frames are received within a prescribed communication interval and, thus, not transferring the frames. In addition, the following technique is described in Matsumoto et al., "A Method of Preventing Unauthorized Data Transmission in Controller Area Network", Vehicular Technology Conference (VTC Spring), IEEE, 2012: Under the precondition that a plurality of nodes do not transmit data frames each having the same ID, transmission of an anomalous frame is prevented by using an error frame if a node detects transmission of a data frame having an ID the same as that of a data frame the node has transmitted.

SUMMARY

Further improvement is required for existing methods.

In one general aspect, the techniques disclosed here feature a frame transmission prevention apparatus connected to a network of a network system including a plurality of electronic control units communicating with one another via the network. The apparatus includes a processor and a memory including at least one set of instructions that causes the processor to perform operations when executed by the processor. The operations include receiving a first frame from the network and switching whether to perform a first process of preventing transmission of the first frame on the basis of management information indicating whether prevention of transmission of a frame is permitted if the first frame satisfies a first condition.

According to the present disclosure, transmission of an attack frame transmitted by an attacker can be properly prevented, and prevention of transmission of a frame that does not cause a particular problem can be evaded.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of the ID and data of a data frame transmitted by an engine ECU according to the first embodiment;

FIG. 7 is a diagram illustrating an example of the ID and data of a data frame transmitted by a brake ECU according to the first embodiment;

FIG. 8 is a diagram illustrating an example of the ID and data of a data frame transmitted by a door open/close sensor ECU according to the first embodiment;

FIG. 9 is a diagram illustrating an example of the ID and data of a data frame transmitted by a window open/close sensor ECU according to the first embodiment;

FIG. 11 is a diagram illustrating an example of an anomaly detection rule held by an anomaly detection ECU according to the first embodiment;

FIG. 12 is a diagram illustrating an example of management information held by the anomaly detection ECU according to the first embodiment;

DETAILED DESCRIPTION

Figure 1:
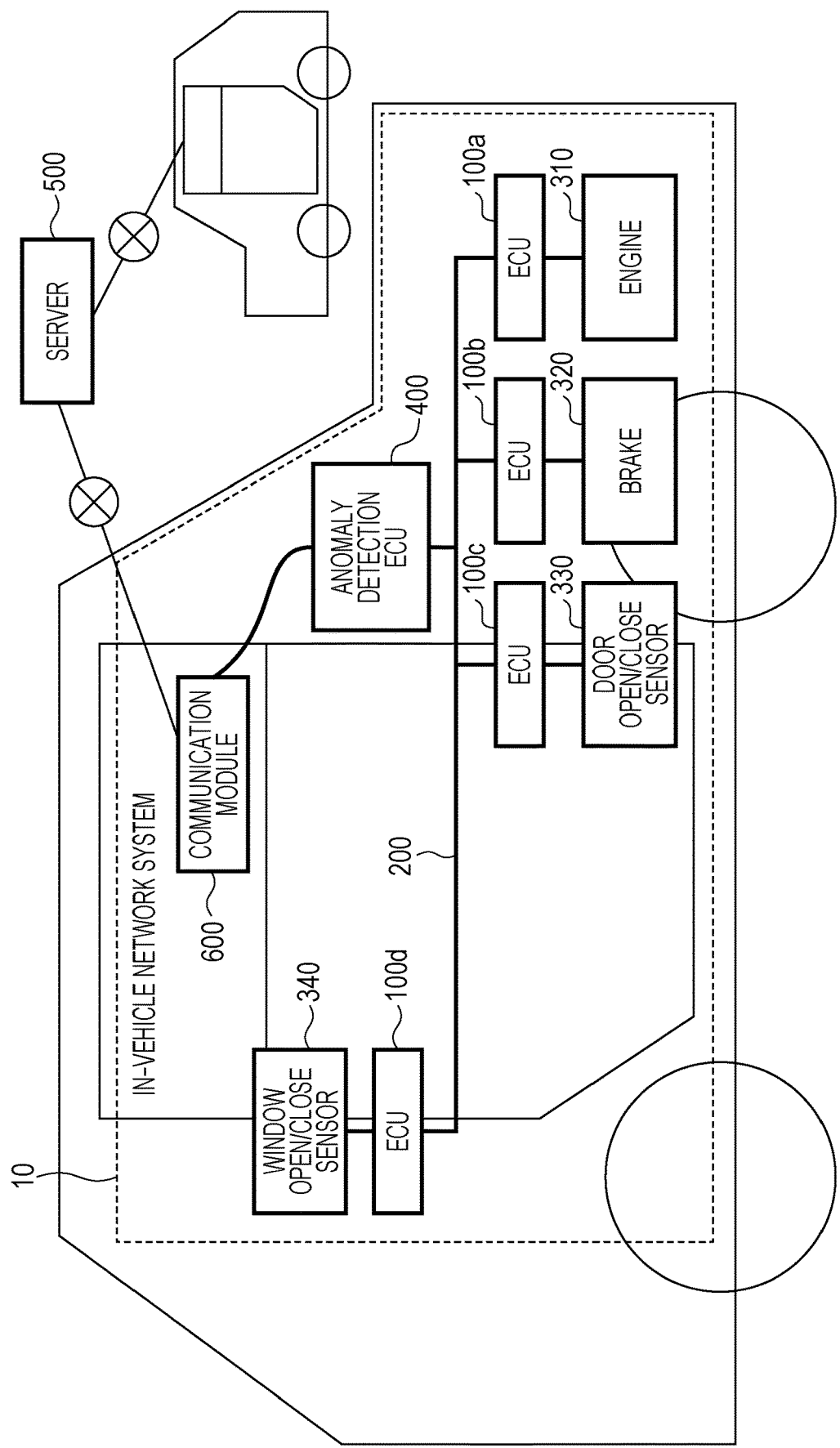
FIG. 1 is a diagram illustrating the configuration of an in-vehicle network system according to a first embodiment.

Underlying Knowledge Forming Basis of the Present Disclosure

For example, a method for preventing transmission of a frame in accordance with the result of conditional determination based on a rule, such as an ID and a communication interval prescribed in a vehicle manufacturing phase has been developed. In such a technique, it is difficult to properly support a change in formation of ECUs constituting the in-vehicle network system (e.g., addition or replacement of an ECU) after manufacturing of the vehicle. Thus, for example, transmission of a frame from an added ECU that does not cause a particular problem may be prevented. Accordingly, the present inventors conceive the aspects of the present disclosure described below.

According to an aspect of the present disclosure, a frame transmission prevention apparatus connected to a network of a network system is provided. The network system includes a plurality of electronic control units communicating with one another via the network. The apparatus includes a processor and a memory including at least one set of instructions that causes the processor to perform operations when executed by the processor. The operations include receiving a first frame from the network and switching whether to perform a first process for preventing transmission of the first frame on the basis of management information indicating whether prevention of transmission of a frame is permitted if the first frame satisfies a first condition. The frame transmission prevention apparatus has a configuration that is effective to evade prevention of transmission of a frame that is not an attack frame and that does not cause a particular problem (for example, malfunction of the network system). According to such a frame transmission prevention apparatus, prevention of transmission of an attack frame from an attacker is enabled, and prevention of transmission of a frame that is not an attack frame and that does not cause a particular problem is disabled. For example, the first condition may be defined so that an anomalous frame which does not follow the rule defined for the network system at the manufacturing stage corresponds to a frame for which transmission is prevented, and the frame transmission prevention apparatus may be manufactured and used. In this case, instead of simply preventing transmission of a frame that satisfies the first condition, the frame transmission prevention apparatus can change whether to prevent transmission of the frame on the basis of the management information. Therefore, even after the frame transmission prevention apparatus is manufactured, the situation in which a frame that is transmitted from an ECU added to the network system and that does not cause a particular problem is erroneously detected as an anomalous attack frame and, thus, transmission of the frame is prevented can be avoided by changing the management information when the ECU is added. Note that the management information referenced by the frame transmission prevention apparatus may be received from the outside of the frame transmission prevention apparatus or from, for example, the recording medium inside the frame transmission prevention apparatus.

In addition, the plurality of electronic control units may communicate with one another via the network in accordance with a controller area network protocol, and the first process may include a process of transmitting an error frame to the network before the rearmost bit of the first frame is received by the processor. In this manner, when a frame satisfies the first condition and, thus, transmission of the frame is to be prevented on the basis of the management information, transmission of the frame on the network can be efficiently prevented by transmitting an error frame. In addition, since the situation in which transmission of a frame which does not cause a particular problem is prevented by an error frame can be avoided, a negative impact of the prevention, such as an increase in traffic caused by retransmission of the frame, can be avoided.

In addition, the memory may store the management information. The management information may include a plurality of flags each corresponding to one of a plurality of IDs. The first frame may have a first ID, and a first flag corresponding to the first ID may indicate whether prevention of transmission of the first frame is permitted. The operations may further include updating the management information stored in the memory so that the first process is performed if the first frame satisfies the first condition and if the first flag indicates that prevention of transmission of the first frame is permitted, and the first process is not performed if the first frame satisfies the first condition and if the first flag indicates that prevention of transmission of the first frame is not permitted. In this manner, for example, for each of the IDs (identifiers) of frames, which identifies the type of data (the content of the frame), the frame transmission prevention apparatus can change whether prevention of transmission of the frame is permitted or not.

In addition, the plurality of flags may indicate that prevention of transmission of a frame is not permitted if the management information has never been updated. Thus, a negative impact caused by prevention of transmission of a frame can be avoided. For example, when an anomaly, such as a malfunction, occurs in the network system or the like due to a frame having an ID the same as the ID of a frame transmitted by an ECU added to the network system, the following operation may be employed: The flag corresponding to the ID is updated so as to indicate that prevention of transmission is permitted. In this example, transmission of the frame is not prevented as long as an anomaly, such as malfunction, does not occur. Accordingly, a negative impact caused by the prevention does not occur.

In addition, the flag may be 1-bit information. In this manner, the capacity of the recording medium required for storing the management information including a flag for each of the IDs can be reduced.

In addition, the updating may include updating the management information in accordance with instruction information externally received by the frame transmission prevention apparatus. In this manner, the execution of the transmission prevention function can be controlled by providing, to the frame transmission prevention apparatus, instruction information from an apparatus (e.g., an electronic control unit) in the network system or an apparatus outside the network system as needed. In this case, for example, the frame transmission prevention apparatus need not have a configuration for appropriately determining whether to update the management information.

In addition, the network system may be an in-vehicle network system. The plurality of electronic control units, the network, and the frame transmission prevention apparatus may be mounted in a vehicle, and the updating may include updating the management information in accordance with the instruction information transmitted by an external apparatus located outside the vehicle. In this manner, the execution of the transmission prevention function can be controlled by providing the instruction information from a server apparatus located outside the vehicle, another vehicle, or the like as needed. For example, the following operation is available: The execution of the frame transmission prevention function by the frame transmission prevention apparatus can be controlled from a server apparatus or the like that collects information from a plurality of vehicles, analyzes the information, and appropriately determines the instruction information. An example of the instruction information may be an instruction to activate the transmission prevention function of the frame in the frame transmission prevention apparatus, that is, an instruction to permit prevention of transmission or an instruction to deactivate the transmission prevention function, that is, an instruction not to permit prevention of transmission.

In addition, the updating may include updating the flag corresponding to a second ID in the management information if the instruction information transmitted by the external apparatus indicates an instruction not to permit prevention of transmission of a second frame having the second ID under the condition that authentication as to whether the external apparatus has predetermined authority is successful and updating the flag corresponding to the second ID so that prevention of transmission of the second frame having the second ID is permitted if the instruction information indicates an instruction to permit prevention of transmission of the second frame having the second ID, regardless of whether the external apparatus has the predetermined authority. In this manner, when there may be an attack by an attacker and, thus, prevention of transmission of the frame is temporarily permitted to defend the attack, a predetermined authority is needed to delete the permission. As a result, the security level of the network system increases.

In addition, the operations may further include transmitting, to another vehicle, second instruction information to permit prevention of transmission of the first frame having the first ID when the first process is performed. When, for example, an attacker transmits an attack frame to the in-vehicle network system of the vehicle including the frame transmission prevention apparatus, the frame transmission prevention apparatus can protect, from the same attack, other vehicles each having a similar frame transmission prevention apparatus mounted therein by transmitting the instruction information.

In addition, the operations may further include transmitting, to the external apparatus, information for analysis including information regarding the first frame if the first frame satisfies the first condition. In this manner, for example, information for analysis that is needed to determine whether transmission of a frame that satisfies a first condition causes a particular problem can be transmitted to an external apparatus. For example, it is possible to operate such that appropriate instruction information is determined by collecting the information for analysis from a plurality of vehicles and analyzing the information by a server apparatus or the like representing the external apparatus. If the external apparatus transmits instruction information as a result of use of the information for analysis, the frame transmission prevention apparatus can receive the instruction information and update the management information.

In addition, the updating may include updating the first flag so that in the case where the first frame satisfies the first condition and the first flag corresponding to the first ID of the first frame indicates that prevention of transmission of the first frame is not permitted, and the prevention is permitted if the occurrence of anomaly is detected on the basis of a second frame having a second ID different from the first ID. In this manner, the frame transmission prevention apparatus can properly prevent transmission of a frame which causes a particular problem, such as a problem of transmission of a frame that satisfies a first condition causing the anomaly in another type of frame flowing in the network. For example, the frame transmission prevention apparatus can be manufactured such that the ID of a frame used in the network system is defined as being used as a specific ID at the manufacturing stage. Alternatively, for example, if the ID of a frame related to important data is defined by the network system at the manufacturing stage or the like, the ID can be used as the specific ID.

In addition, the updating may include updating the first flag so that in the case where the first frame satisfies the first condition and the first flag corresponding to the first ID of the first frame indicates that prevention of transmission of the first frame is not permitted, the prevention is permitted if it is detected that a predetermined particular electronic control unit among the plurality of electronic control units is anomalous. In this manner, the frame transmission prevention apparatus can properly prevent transmission of a frame that causes a particular problem, such as a problem of transmission of a frame that satisfies a first condition causing anomaly in a particular ECU. For example, the frame transmission prevention apparatus may be manufactured such that an ECU provided by the network system is defined as being used as the particular ECU at the manufacturing stage or the like. Alternatively, for example, an ECU that is important in a network system, for example, an ECU related to travel control of a vehicle in an in-vehicle network system may be used as the particular ECU.

In addition, the first condition may include a condition related to the ID of a frame. If the first ID of the first frame satisfies the first condition, the switching may switch whether to perform the first process on the basis of the management information. In this manner, for example, if the first condition is set so as to define frame IDs that are not used in the constructed network system, that is, an ID group that is considered as being anomalous or the like, prevention of transmission of an attack frame from an attacker to the network can be accomplished on the basis of the management information. As a result of prevention of transmission of an attack frame, the security of the network system is ensured.

In addition, the plurality of electronic control units may communicate with one another via the network in accordance with a controller area network protocol. The first condition may include a condition related to Data Length Code (DLC) of a data frame representing a frame. If the DLC of the first frame satisfies the first condition, the switching may switch whether to perform the first process on the basis of the management information. In this manner, if, for example, the first condition is set so as to define a DLC that is not used in the constructed network system, that is, a DLC that is considered as being anomalous, prevention of transmission of an attack frame that includes the DLC and that is transmitted by an attacker to the network can be accomplished.

In addition, the plurality of electronic control units may communicate with one another via the network in accordance with a controller area network protocol. The first condition may be a condition related to data in a data field of a data frame representing a frame. If the data in the data field of the first frame satisfies the first condition, the switching may switch whether to perform the first process on the basis of the management information. In this manner, if, for example, the first condition is set so as to define data considered as being anomalous, prevention of transmission of an attack frame that includes the data and that is transmitted by an attacker to the network can be accomplished.

In addition, the first condition may include a condition that is satisfied if a frame does not include a proper message authentication code. In this manner, prevention of transmission of an attack frame that does not include a proper message authentication code and that is transmitted by an attacker to the network can be accomplished on the basis of the management information.

In addition, the plurality of electronic control units may communicate with one another via the network in accordance with a controller area network protocol, and the first process may include a process of transmitting a dominant signal to the network while the first frame is being transmitted. In this manner, in the case where transmission of a frame that satisfies the first condition indicating a frame for which transmission is prevented is prevented on the basis of the management information, complete transmission of the frame on the network can be prevented by overwriting and modifying the content of the frame with the transmitted dominant signal. Modification of the content of the frame on the network causes, for example, a reception error. As a result, it can be prevented that an ECU in the receiving node considers the frame as a normal frame and processes the frame.

According to another aspect of the present disclosure, a frame transmission prevention method for use of a network system including a plurality of electronic control units communicating with one another via a network is provided. The method includes receiving a first frame from the network and switching whether to perform a first process for preventing transmission of the first frame if the first frame satisfies a first condition on the basis of management information indicating whether prevention of transmission of a frame is permitted. In this manner, execution of the first process related to prevention of transmission of the frame is controlled on the basis of the management information. As a result, prevention of transmission of an attack frame from an attacker can be accomplished. In addition, prevention of transmission of a frame that is not an attack frame and that does not cause a predetermined problem can be evaded.

According to another aspect of the present disclosure, an in-vehicle network system including a plurality of electronic control units communicating with one another via a network is provided. The system includes a processor and a memory. The memory includes at least one set of instructions that causes the processor to perform operations when executed by the processor. The operations include receiving a first frame from the network and switching whether to perform a first process of preventing transmission of the first frame on the basis of management information indicating whether prevention of transmission of a frame is permitted if the first frame satisfies a first condition. As a result, prevention of transmission of an attack frame from an attacker to the in-vehicle network can be accomplished. In addition, prevention of transmission of a frame that is not an attack frame and that does not cause a predetermined problem can be evaded.

It should be noted that general or specific embodiments may be implemented as a system, a method, an integrated circuit, a computer program, a computer-readable recording medium, such as a CD-ROM, or any selective combination thereof.

An in-vehicle network system including a frame transmission prevention apparatus using a frame transmission prevention method according to an embodiment is described below with reference to the accompanying drawings. Note that each of the embodiments described below is an example of the present disclosure. Accordingly, a value, constituent elements, the positions and the connection form of the constituent elements, steps serving as elements of the processing, and the sequence of steps described in the embodiments are only examples and shall not be construed as limiting the scope of the present disclosure. In addition, among the constituent elements in the embodiments described below, the constituent element that does not appear in an independent claim, which has the broadest scope, is described as an optional constituent element. In addition, all the drawings are schematic and not necessarily to scale.

First Embodiment

According to a first embodiment of the present disclosure, an in-vehicle network system 10 is described below with reference to the accompanying drawings. The in-vehicle network system 10 includes a plurality of ECUs each performing communication according to the CAN protocol and an anomaly detection ECU serving as a frame transmission prevention apparatus having a function of preventing transmission of a data frame detected as being anomalous.

1.1 Configuration of in-Vehicle Network System

FIG. 1 is a diagram illustrating the configuration of the in-vehicle network system 10 mounted in a vehicle. Note that another vehicle and a server 500 located outside the vehicle are also illustrated in FIG. 1.

The in-vehicle network system 10 is an example of a network system that performs communication according to the CAN protocol and is a network system of a vehicle (for example, an automobile) including a variety of devices, such as a control unit, a sensor, an actuator, and a user interface device. The in-vehicle network system 10 includes a plurality of ECUs that perform communication relating to frames via a bus (a network bus). The in-vehicle network system 10 employs a frame transmission prevention method for preventing transmission of a frame under certain conditions. More specifically, as illustrated in FIG. 1, the in-vehicle network system 10 includes a bus 200, ECUs 100a to 100d each connected to the bus 200, an anomaly detection ECU 400, and a communication module 600. For convenience of description, the following description is given with reference to the anomaly detection ECU 400 and the ECUs 100a to 100d, although the in-vehicle network system 10 further includes many ECUs in addition to the anomaly detection ECU 400 and the ECUs 100a to 100d. The ECU 100a is also referred to as an "engine ECU 100a", the ECU 100b is also referred to as a "brake ECU 100b", the ECU 100c is also referred to as a "door open/close sensor ECU 100c", and the ECU 100d is also referred to as a "window open/close sensor ECU 100d".

Each of the ECUs is an apparatus including, for example, a processor (a microprocessor), a digital circuit, such as a memory, an analog circuit, and a communication circuit. Examples of the memory include a ROM and a RAM. The memory can store a program (a computer program) executed by the processor. For example, the processor operates in accordance with the program, so that the ECU achieves various functions. Note that in order to achieve a predetermined function, the computer program is formed by combining a plurality of instruction codes indicating instructions to the processor. Each of the ECUs can transmit and receive a frame via the bus 200 in accordance with the CAN protocol. One type of frame exchanged between the ECUs is a data frame. The data frame can include, for example, data used to control the vehicle, such as data related to the state of the vehicle or instruction data used to control the vehicle. Each of the ECUs can be connected to one of a variety of types of devices. The engine ECU 100a is connected to an engine 310 and periodically transmits, to bus 200, a data frame indicating the state of the engine 310. The brake ECU 100b is connected to the brake 320 and periodically transmits, to the bus 200, a data frame indicating the state of a brake 320. The door open/close sensor ECU 100c is connected to a door open/close sensor 330 and periodically transmits, to the bus 200, a data frame indicating the open/close state of the door detected by the door open/close sensor 330. Furthermore, the window open/close sensor ECU 100d is connected to a window open/close sensor 340 and periodically transmits, to the bus 200, a data frame indicating the open/close state of the window detected by the window open/close sensor 340.

The anomaly detection ECU 400 is a kind of ECU that functions as a frame transmission prevention apparatus. The anomaly detection ECU 400 is connected to the bus 200. The anomaly detection ECU 400 has a function of monitoring data frames flowing on the bus 200 and, upon detecting a data frame that meets a predetermined condition concerning a predetermined anomalous frame, performing a predetermined process to prevent transmission of the frame on the basis of predetermined management information (the function is referred to as a "transmission prevention function").

The communication module 600 is a module including a communication circuit for communicating with the server 500. The communication module 600 is directly connected to the anomaly detection ECU 400 via an interface, such as USB (Universal Serial Bus).

The in-vehicle network system 10 can be mounted on each of a plurality of vehicles.

The server 500 is a computer functioning as a server apparatus located outside the vehicle. The server 500 is capable of communicating with a plurality of vehicles. For example, the server 500 and a plurality of vehicles form a vehicle management system. The server 500 communicates with the communication module 600 connected to the anomaly detection ECU 400 in each of a plurality of vehicles via a wired or wireless communication network. To update the firmware (FW) of the anomaly detection ECU 400, the server 500 has a function of transmitting a delivery message including FW for update to the anomaly detection ECU 400.

1.2 Format of Data Frame

A data frame used in a network according to the CAN protocol is described below.

Figure 2:
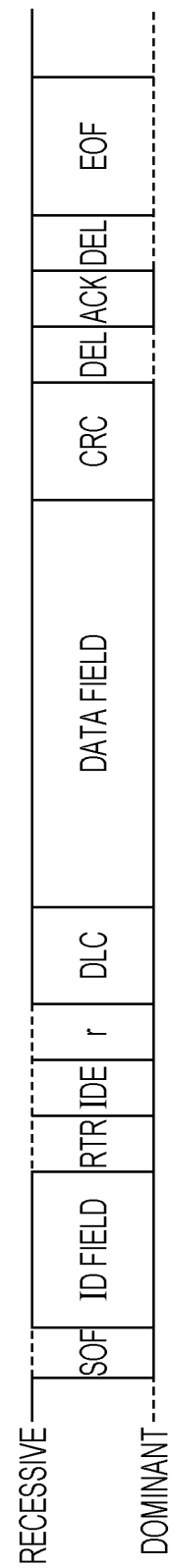
FIG. 2 is a diagram illustrating the format of a data frame defined by the CAN protocol.

FIG. 2 is a diagram illustrating the format of a data frame defined by the CAN protocol. In FIG. 2, a data frame having the standard ID format defined by the CAN protocol is illustrated. The data frame includes SOF (Start Of Frame), an ID field, RTR (Remote Transmission Request), IDE (Identifier Extension), a reserved bit "r", DLC (Data Length Code), a data field, a CRC (Cyclic Redundancy Check) sequence, a CRC delimiter "DEL", an ACK (Acknowledgment) slot, an ACK delimiter "DEL", and EOF (End Of Frame).

SOF consists of 1 dominant bit. When the bus is in an idle state, the bus is recessive. By changing the state to dominant by SOF, start of transmission of a frame is notified.

The ID field is a field consisting of 11 bits. The ID field stores an ID which is a value indicating the type of data. If a plurality of nodes start transmission at the same time, communication arbitration is performed by using the ID field. Thus, the design is such that a frame having a smaller ID value has a higher priority.

RTR is a value used to identify whether the data frame is a data frame or a remote frame. RTR consists of 1 dominant bit for the data frame.

Each of IDE and "r" consists of 1 dominant bit.

DLC consists of 4 bits. DLC is a value indicating the length of the data field.

The data field is a value indicating the content of data to be transmitted. The data field consists of a maximum of 64 bits. The length of the data field can be adjusted so as to be multiples of 8 bits. The specification of the data to be transmitted is not provided by the CAN protocol and is determined by the in-vehicle network system. Therefore, the specifications depend on the type of automobile or a manufacturer, for example.

The CRC sequence consists of 15 bits. The CRC sequence is calculated from transmission values of the SOF, ID field, control field, and data field.

The CRC delimiter is a delimiter representing the end of a CRC sequence. The CRC delimiter consists of 1 recessive bit.

The ACK slot consists of 1 bit. The transmitting node sets the ACK slot to recessive and performs transmission. The receiving node transmits an ACK slot set to dominant if the receiving node can normally receive the data prior to the CRC sequence and the CRC sequence. Since dominant has priority over recessive, the transmitting node can be aware that any one of the receiving nodes succeeded in receiving the data frame if the ACK slot is dominant after transmission.

The ACK delimiter is a delimiter indicating the end of the ACK. The ACK delimiter consists of 1 recessive bit.

EOF consists of 7 recessive bits. EOF indicates the end of the data frame.

1.3 Format of Error Frame

Figure 3:
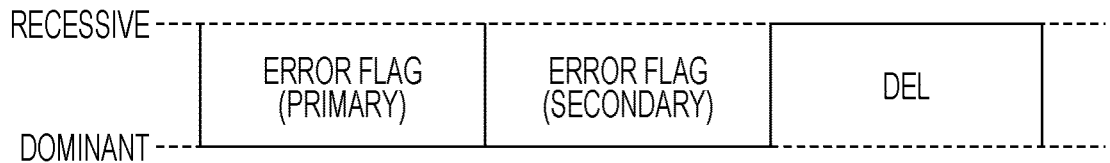
FIG. 3 is a diagram illustrating the format of an error frame defined by the CAN protocol.

FIG. 3 is a diagram illustrating the format of an error frame defined by the CAN protocol. The error frame includes an error flag (primary), an error flag (secondary), and an error delimiter "DEL".

The error flag (primary) is used to inform other nodes of the occurrence of an error. Upon detecting an error, a node transmits 6 dominant bits continuously to inform other nodes of the occurrence of the error. This transmission violates the bit stuffing rule of the CAN protocol (that is, a rule stating that consecutive 6 or more bits having the same value are not to be transmitted), which causes transmission of an error frame (secondary) from another node.

The error flag (secondary) consists of 6 consecutive dominant bits, which is used to inform other nodes of the occurrence of an error. All the nodes that have received the error flag (primary) and has detected the bit stuffing rule violation transmit the error flag (secondary).

The error delimiter "DEL" consists of 8 consecutive recessive bits. The error delimiter "DEL" indicates the end of the error frame.

1.4 Configuration of ECU

Figure 4:
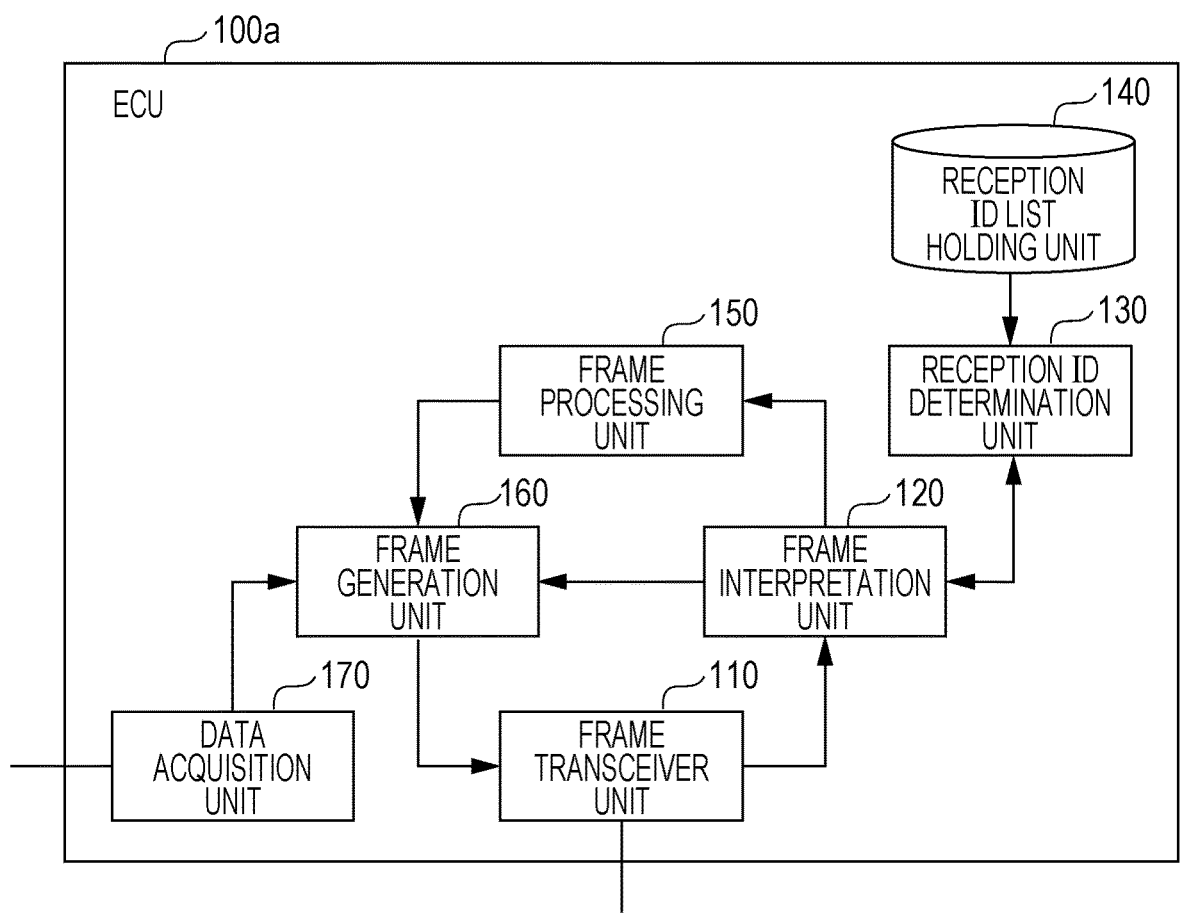
FIG. 4 is a configuration diagram of an ECU according to the first embodiment.

FIG. 4 is a configuration diagram of the ECU 100a. The ECU 100a includes a frame transceiver unit 110, a frame interpretation unit 120, a reception ID determination unit 130, a reception ID list holding unit 140, a frame processing unit 150, a frame generation unit 160, and a data acquisition unit 170. Each of the constituent elements is a functional element. Each of the functions of the constituent elements is provided by, for example, the communication circuit and one of the processor that executes a program stored in the memory and a digital circuit in the ECU 100a. Note that each of the ECUs 100b to 100d has a configuration that is the same as that of the ECU 100a.

The frame transceiver unit 110 transmits and receives, to and from the bus 200, a frame according to the CAN protocol. The frame transceiver unit 110 receives a frame from the bus 200 in a bit-by-bit manner and transfers the frame to the frame interpretation unit 120. In addition, the frame transceiver unit 110 transmits, to the bus 200, the content of the frame sent from the frame generation unit 160. The processing that conforms to the CAN protocol, such as communication arbitration, is also provided by the frame transceiver unit 110.

The frame interpretation unit 120 receives the values in the frame from the frame transceiver unit 110 and interprets the values so as to map each of the values to one of the fields of the frame format prescribed by the CAN protocol. The value determined to correspond to the ID field is transferred to the reception ID determination unit 130. The frame interpretation unit 120 determines, on the basis of the result of determination notified by the reception ID determination unit 130, whether the value of the ID field and the data field that appears after the ID field are transferred to the frame processing unit 150 or the reception of the frame after the notification of the result of determination is stopped (i.e., the interpretation of the frame is stopped). However, if the frame interpretation unit 120 determines that the frame does not conform to the CAN protocol, the frame interpretation unit 120 instructs the frame generation unit 160 to transmit an error frame. In addition, upon receiving an error frame (i.e., interpreting the received frame by using the values in the frame and determining that the frame is an error frame), the frame interpretation unit 120 discards the frame thereafter, that is, discontinues the interpretation of the frame.

The reception ID determination unit 130 receives the value of the ID field sent from the frame interpretation unit 120. Thereafter, the reception ID determination unit 130 determines whether the value of each of the fields subsequent to the ID field is to be received in accordance with a list of IDs held by the reception ID list holding unit 140. The reception ID determination unit 130 notifies the frame interpretation unit 120 of the result of determination.

Figure 5:
FIG. 5 is a diagram illustrating an example of a reception ID list in the ECU according to the first embodiment.

The reception ID list holding unit 140 holds the reception ID list that is a list of IDs to be received by the ECU 100a. FIG. 5 illustrates an example of the reception ID list.

The frame processing unit 150 performs processing relating to different functions for each of the ECUs in accordance with the data of the received frame. For example, the engine ECU 100a has a function of emitting an alarm sound if the door is open when the speed exceeds 30 km/h. The engine ECU 100a has, for example, a loudspeaker or the like for emitting an alarm sound. In addition, the frame processing unit 150 of the engine ECU 100a manages, for example, data (for example, information indicating the state of the door) received from another ECU and performs a process to emit an alarm sound under a predetermined condition on the basis of the speed acquired from the engine 310. The frame processing unit 150 of the ECU 100c having a configuration the same as that of the ECU 100a performs a process of emitting an alarm sound if a door is open when no brake is applied. Note that the frame processing unit 150 may perform processing relating to the data of a frame other than the data described above.

The data acquisition unit 170 acquires data indicating the states of the devices, sensors, and the like connected to the ECU and supplies the data to the frame generation unit 160.

In response to the notification sent from the frame interpretation unit 120 to instruct transmission of an error frame, the frame generation unit 160 forms an error frame and instructs the frame transceiver unit 110 to transmit the error frame. In addition, the frame generation unit 160 forms a data frame by adding a predetermined ID to the value of the data sent from the data acquisition unit 170. Thereafter, the frame generation unit 160 sends the data frame to the frame transceiver unit 110. The content of the frame transmitted by each of the ECUs 100a to 100d is described below with reference to FIGS. 6 to 9.

1.5 Example of Reception ID List

FIG. 5 is a diagram illustrating an example of the reception ID list retained in each of the ECUs 100a to 100d. The reception ID list illustrated in FIG. 5 is an ID list indicating that the value of the ID is "ALL". This example indicates that an ECU receives, from the bus 200, a data frame including any one of IDs.

1.6 Example of Frame Transmitted from Engine ECU

FIG. 6 is a diagram illustrating an example of an ID and the data in the data field of a data frame transmitted from the engine ECU 100a connected to the engine 310. The ID of a data frame transmitted by the engine ECU 100a is "1". The data is given in units of km/hour and is in the range of 0 (km/h) (the lowest value) to 180 (km/h) (the highest value). The data length is 1 byte. In FIG. 6, the IDs and data corresponding to respective data frames that are sequentially transmitted from the engine ECU 100a are illustrated in the uppermost row to the lowermost row. FIG. 6 indicates that the speed increases from 0 km/hour in increments of 1 km/hour.

1.7 Example of Frame Transmitted from Brake ECU

FIG. 7 is a diagram illustrating an example of the ID and the data in the data field of a data frame transmitted from the brake ECU 100b connected to the brake 320. The ID of the data frame transmitted by the brake ECU 100b is "2". In the data, the degree of brake application is expressed as a ratio (%), and the data length is 1 byte. The ratio is set to 0(%) when no braking force is applied, and the ratio is set to 100(%) when maximum braking force is applied. In FIG. 7, the IDs and data corresponding to respective data frames that are sequentially transmitted from the brake ECU 100b are illustrated in the uppermost row to the lowermost row. FIG. 7 indicates that the braking force gradually decreases from 100%.

1.8 Example of Frame Transmitted from Door Open/Close Sensor ECU

FIG. 8 is a diagram illustrating an example of the ID and data field (the data) of the data frame transmitted from the door open/close sensor ECU 100c connected to the door open/close sensor 330. The ID of the data frame transmitted from the door open/close sensor ECU 100c is "3". The data represents the open/close state of the door, and the data length is 1 byte. The value of the data is "1" when the door is open, and the value of the data is "0" when the door is closed. In FIG. 8, the IDs and data corresponding to respective data frames that are sequentially transmitted from the door open/close sensor ECU 100c are illustrated in the uppermost row to the lowermost row. FIG. 8 indicates that the state in which the door is open is gradually changed to the state in which the door is closed.

1.9 Example of Frame Transmitted from Window Open/Close Sensor ECU

FIG. 9 is a diagram illustrating an example of the ID and the data field (the data) of a data frame transmitted from the window open/close sensor ECU 100d connected to the window open/close sensor 340. The ID of the data frame transmitted from the window open/close sensor ECU 100d is "4". The data represents the open/close state of the window (window) as a ratio (%), and the data length is 1 byte. The ratio is 0(%) when the window is completely closed, and the ratio is 100(%) when the window is fully open. In FIG. 9, the IDs and data corresponding to respective data frames that are sequentially transmitted from the window open/close sensor ECU 100d are illustrated in the uppermost row to the lowermost row. FIG. 9 indicates that the state in which the door is closed is gradually changed to the state in which the door is open.

1.10 Configuration of Anomaly Detection ECU

Figure 10:
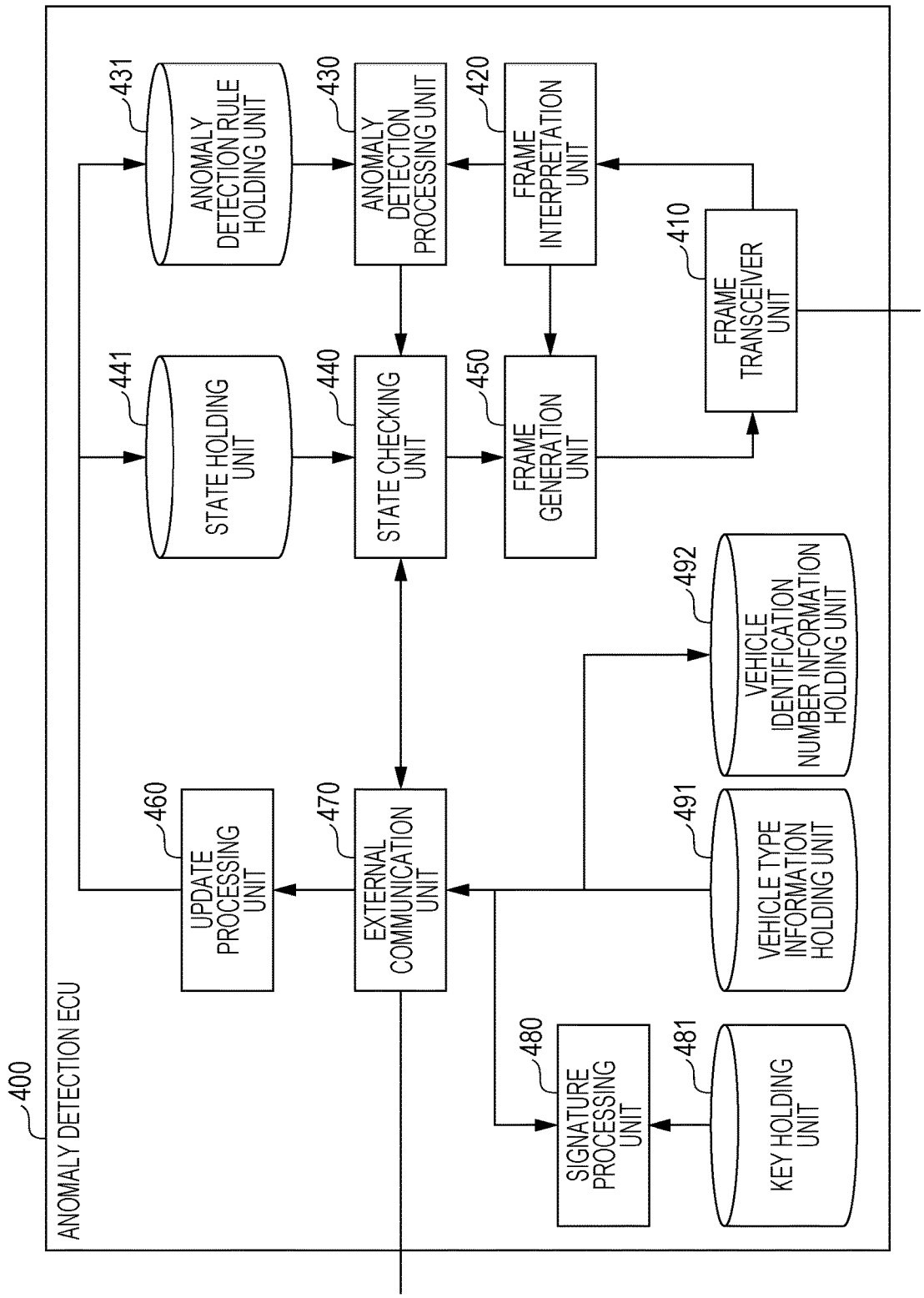
FIG. 10 is a configuration diagram of an anomaly detection ECU according to the first embodiment.

FIG. 10 is a configuration diagram of the anomaly detection ECU 400. The anomaly detection ECU 400 includes a frame transceiver unit 410, a frame interpretation unit 420, an anomaly detection processing unit 430, a anomaly detection rule holding unit 431, a state checking unit 440, a state holding unit 441, a frame generation unit 450, an updating processing unit 460, an external communication unit 470, a signature processing unit 480, a key holding unit 481, a vehicle type information holding unit 491, and a vehicle identification number information holding unit 492. The function of each of the constituent elements is provided by, for example, the communication circuit, the processor that executes a program stored in the memory, the digital circuit, or the like in the anomaly detection ECU 400.

The frame transceiver unit 410 transmits and receives, to and from the bus 200, a frame according to the CAN protocol. The frame transceiver unit 410 functions as a reception unit that receives a frame from the bus in a bit-by-bit manner. The frame transceiver unit 410 transfers the received frame to the frame interpretation unit 420. In addition, the frame transceiver unit 410 transmits, to the bus 200, the content of a frame on the basis of the frame received from the frame generation unit 450 in a bit-by-bit manner.

The frame interpretation unit 420 receives the values in the frame received from the frame transceiver unit 410 and interprets the values so as to map each of the values to one of the fields of the frame format prescribed by the CAN protocol. The frame interpretation unit 420 transfers the value determined as the value in the ID field of the received data frame, that is, the ID, to the anomaly detection processing unit 430. If the frame interpretation unit 420 determines that the frame does not conform to the CAN protocol, the frame interpretation unit 420 instructs the frame generation unit 450 to transmit an error frame. Furthermore, if the frame interpretation unit 420 receives an error frame, that is, if the frame interpretation unit 420 interprets that the frame is an error frame from the values in the received frame, the frame interpretation unit 420 discards the frame thereafter, that is, discontinues the interpretation of the frame.

The anomaly detection processing unit 430 receives the value of the ID field sent from the frame interpretation unit 420. That is, the anomaly detection processing unit 430 receives the ID of the data frame received by the anomaly detection ECU 400. The anomaly detection processing unit 430 determines whether the received ID is unauthorized in accordance with an authorized ID list representing the anomaly detection rule held in the anomaly detection rule holding unit 431. If the anomaly detection processing unit 430 determines that the ID is unauthorized, that is, if the anomaly detection processing unit 430 detects an anomaly, the anomaly detection processing unit 430 notifies the state checking unit 440 of that information. In the anomaly detection ECU 400, a data frame that is being received and that has an ID detected by the anomaly detection processing unit 430 as being anomalous is detected as an anomalous data frame. Note that the detected anomalous data frame is a data frame that is merely determined being as anomalous on the basis of the anomaly detection rule held in advance in the anomaly detection rule holding unit 431. The anomaly detection rule can be defined to detect the occurrence of an anomaly by, for example, distinguishing an anomalous data frame that is highly likely to be anomalous from the other data frames. The anomaly detection rule may be defined from the viewpoint of a safe defense against an attack even if the anomaly detection rule is prescribed such that an error detection is not completely prevented. Moreover, it may become difficult to accurately determine whether an anomaly has occurred after addition of a new ECU to the in-vehicle network system 10 or a change in other circumstances. For this reason, although, for example, a data frame that is determined to be anomalous on the basis of the anomaly detection rule is likely to be anomalous, the data frame does not always have an adverse impact on the in-vehicle network system 10 and, thus, the data in the data frame is not always anomalous.

The anomaly detection rule holding unit 431 holds information related to the anomaly detection rule stating whether the ID included in the data frame received by the anomaly detection ECU 400 is anomalous. FIG. 11 illustrates an example of the anomaly detection rule.

If an anomalous data frame is detected by the anomaly detection processing unit 430, the state checking unit 440 checks the state related to activation of the transmission prevention function indicated by the management information held by the state holding unit 441. The state in which the transmission prevention function is activated is a state in which execution of the transmission prevention function is permitted, that is, a state in which it is permitted to prevent a data frame detected as being anomalous by the anomaly detection processing unit 430 from being transmitted over the in-vehicle network. The state in which the transmission prevention function is not activated is a state in which execution of the transmission prevention function is not permitted, that is, a state in which it is not permitted to prevent a data frame detected as being anomalous by the anomaly detection processing unit 430 from being transmitted over the in-vehicle network. If an anomalous data frame is detected with the transmission prevention function activated, the state checking unit 440 sends, to the frame generation unit 450, a message to transmit an error frame. However, if an anomalous data frame is detected with the transmission prevention function not activated, the state checking unit 440 checks the state of the vehicle. If a problem, such as malfunction, is detected, the state checking unit 440 sends log information about the data frame detected as being anomalous to the external communication unit 470.

The state holding unit 441 is implemented as part of the area of a recording medium, such as a nonvolatile memory, for example. The state holding unit 441 holds management information indicating the state relating to activation of the transmission prevention function. FIG. 12 illustrates an example of the management information.

The frame generation unit 450 configures an error frame in response to the message received from the frame interpretation unit 420 and instructing transmission of an error frame. Thereafter, the frame generation unit 450 sends the error frame to the frame transceiver unit 410, which transmits the error frame. In addition, the frame generation unit 450 configures an error frame in response to the message received from the state checking unit 440 and instructing transmission of an error frame. Thereafter, the frame generation unit 450 sends the error frame to the frame transceiver unit 410, which transmits the error frame.

The updating processing unit 460 performs an updating process. The updating process is a process of acquiring the FW from the external communication unit 470 and updating the management information held by the state holding unit 441 the state holding unit 441 by using the FW. Note that the updating processing unit 460 may update the anomaly detection rule in addition to updating the management information or may update the anomaly detection rule instead of updating the management information by the FW acquired from the external communication unit 470. The updating of the management information by the updating processing unit 460 using the FW is performed by, for example, causing the processor to execute the FW for updating the management information or by causing the state holding unit 441 to hold, as the management information, the data that is included in the FW and that indicates new management information.

The external communication unit 470 communicates with the server 500 via the communication module 600 and acquires a delivery message. The external communication unit 470 sends the acquired delivery message to the signature processing unit 480 and acquires the result of verification of the signature of the delivery message. If the verification is successful, the external communication unit 470 sends the FW in the delivery message to the updating processing unit 460. In addition, the external communication unit 470 adds the vehicle type information acquired from the vehicle type information holding unit 491 and the vehicle identification number information acquired from the vehicle identification number information holding unit 492 to the log information about the data frame sent from the state checking unit 440 to generate an unsigned anomaly detection message. The anomaly detection message includes the log information about the data frame detected as being anomalous. The anomaly detection message is, for example, analysis information to be analyzed by the server 500 as to whether anomalies have occurred in the in-vehicle network system 10. The external communication unit 470 sends the anomaly detection message to the signature processing unit 480 and acquires signature data. Thus, the external communication unit 470 converts the unsigned anomaly detection message into a signed anomaly detection message and transmits the signed anomaly detection message to the server 500 via the communication module 600.

The signature processing unit 480 verifies the signed delivery message sent from the external communication unit 470 by using a key acquired from the key holding unit 481 and sends a message indicating the result of verification to the external communication unit 470. In addition, the signature processing unit 480 generates signature data for the unsigned anomaly detection message sent from the external communication unit 470 by using the key acquired from the key holding unit 481. Thereafter, the signature processing unit 480 transmits the generated signature data to the external communication unit 470.

The key holding unit 481 holds the key used by the signature processing unit 480.

The vehicle type information holding unit 491 holds the vehicle type information indicating the type of vehicle having the anomaly detection ECU 400 mounted therein.

The vehicle identification number information holding unit 492 holds the vehicle identification number information, which is information for identifying the vehicle having the anomaly detection ECU 400 mounted therein. The vehicle identification number information indicates, for example, the vehicle model and the manufacturer's serial number.

1.11 Anomaly Detection Rule

FIG. 11 illustrates an example of the anomaly detection rule held by the anomaly detection rule holding unit 431 of the anomaly detection ECU 400.

The authorized ID list according to the anomaly detection rule illustrated in FIG. 11 as an example is a so-called whitelist. The authorized ID list in this example indicates an anomaly detection rule. According to the anomaly detection rule, even when a data frame having an ID of any one of "1", "2", "3", and "4" is transmitted to the bus 200, the data frame is not determined as being anomalous. However, a data frame having an ID of another value is transmitted to the bus 200, the data frame is determined as being anomalous (that is, the data frame is detected as being anomalous).

1.12 Management Information

FIG. 12 illustrates an example of the management information held by the state holding unit 441 of the anomaly detection ECU 400. The management information is information indicating whether execution of the transmission prevention function is permitted or not.

In the example illustrated in FIG. 12, the management information includes the IDs of the data frames each associated with flag information indicating whether execution of a transmission prevention function is permitted. The transmission prevention function prevents a data frame from being transmitted if the data frame having the ID is detected as being anomalous by the anomaly detection rule.

The flag information consists of, for example, 1 bit. For example, a bit value of 1 indicates that execution of the transmission prevention function is permitted. In contrast, a bit value of 0 indicates that execution of the transmission prevention function is not permitted. As an example, if the management information has not yet been updated by the updating processing unit 460, the flag information may indicate that prevention of transmission of a data frame is not permitted.

In the example illustrated in FIG. 12, the flag information for ID "1" indicates that the bit value is 0 and, thus, execution of the transmission prevention function is not permitted. This means that the transmission prevention function of the anomaly detection ECU 400 is not activated for the data frame with an ID of "1". In addition, in the example illustrated in FIG. 12, the flag information for ID "5" indicates that the bit value is 1 and, thus, execution of the transmission prevention function is permitted. This means that the transmission prevention function of the anomaly detection ECU 400 is activated for the data frame with an ID of "5". Furthermore, for example, in the example illustrated in FIG. 12, a bit value of 0 in the flag information for ID "6" indicates that if a data frame with an ID of "6" flowing in the bus 200 is detected as being anomalous, the transmission of the data frame is not prevented. For example, if the bit value of the flag information for ID "6" is changed to 1 and if the data frame with an ID of "6" flowing in the bus 200 is detected as being anomalous, prevention of transmission of the data frame is permitted.

Note that the meaning of the bit values 0 and 1 of the flag information may be reversed, or the flag information may consist of multiple bits. In addition, the management information may be only one piece of flag information that determines whether the transmission prevention function is executed for all of data frame detected as being anomalous, regardless of the IDs.

1.13 Configuration of Server

The server 500 includes a memory, a recording medium, such as a hard disk, a processor, and a communication circuit.

Figure 13:
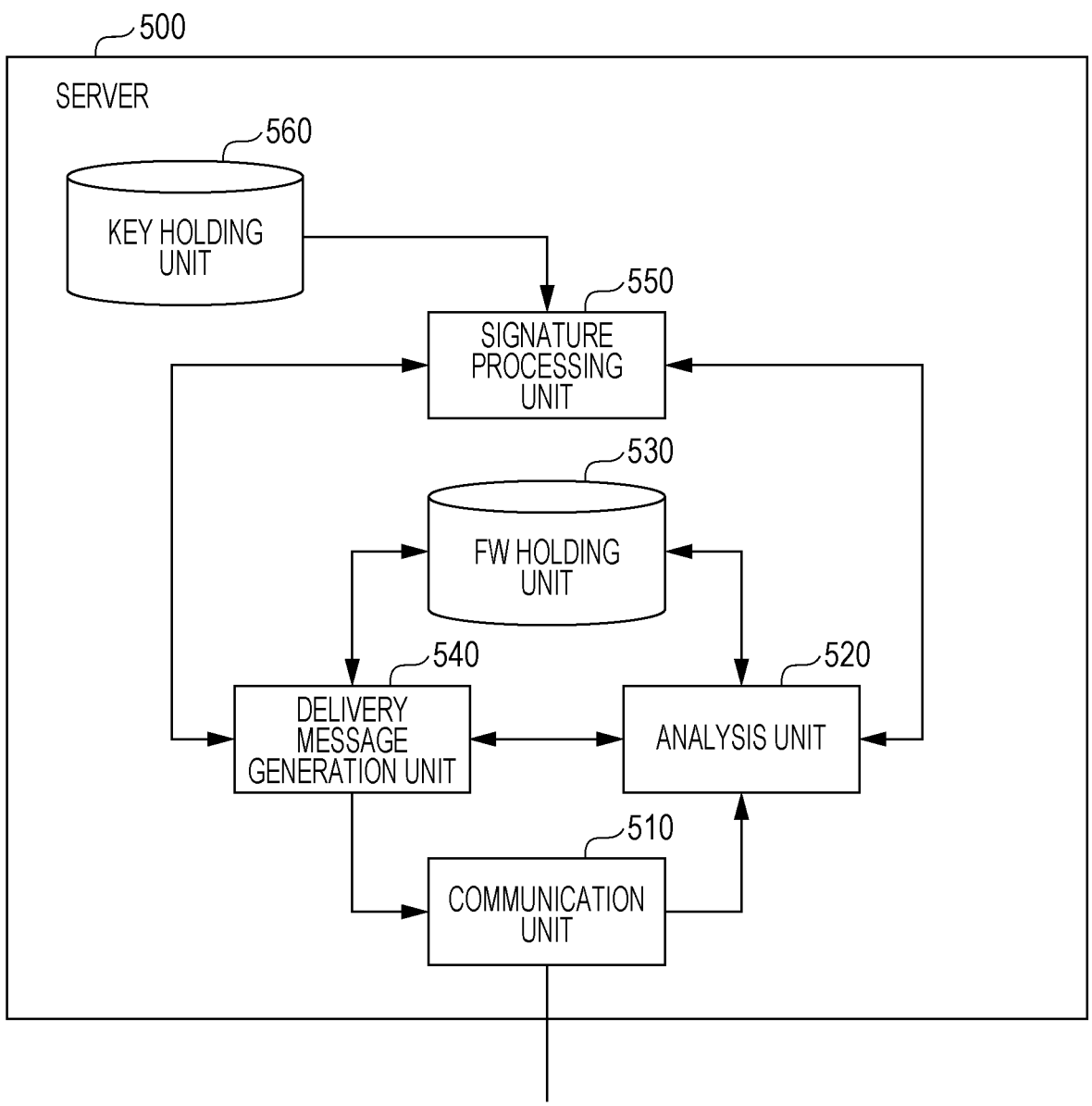
FIG. 13 is a configuration diagram of a server according to the first embodiment.

FIG. 13 is a configuration diagram of the server 500. The server 500 includes, as functional constituent elements, a communication unit 510, an analysis unit 520, an FW holding unit 530, a delivery message generation unit 540, a signature processing unit 550, and a key holding unit 560. Each of the constituent elements is implemented by a communication circuit, a processor that executes a program stored in the memory, and the like in the server 500.

The communication unit 510 transmits, to a vehicle, the delivery message transmitted from the delivery message generation unit 540. This delivery message is received by the communication module 600 of the vehicle and is transmitted to the anomaly detection ECU 400. In addition, the communication unit 510 receives the anomaly detection message transmitted from the anomaly detection ECU 400 of the vehicle via the communication module 600 and sends the anomaly detection message to the analysis unit 520.

The analysis unit 520 sends, to the signature processing unit 550, the received anomaly detection message and acquires the result of verification of the signature of the anomaly detection message. In addition, the analysis unit 520 analyzes the log information regarding the data frame detected as being anomalous, which is included in the analysis information serving as the anomaly detection message for which the signature verification is successful. Thus, the analysis unit 520 determines whether the data frame is an anomalous data frame that causes an anomaly on the in-vehicle network system 10, such as malfunction of the vehicle. If the analysis unit 520 determines that the data frame detected as being anomalous is an anomalous data frame that causes an anomaly, the analysis unit 520 generates FW for activating the transmission prevention function that prevents a similar data frame from being transmitted when the data frame is detected as being anomalous by the anomaly detection ECU 400. The analysis unit 520 instructs the FW holding unit 530 to hold the generated FW. Note that the log information about the data frame detected as being anomalous, which is set in the analysis information by the anomaly detection ECU 400, may include the content of the data frame, the reception interval or the reception frequency of data frames having an ID the same as the ID of the data frame, and log data related to the state of the vehicle acquired by monitoring the state of the vehicle for a predetermined period of time after reception of the data frame. An example of the log data obtained by monitoring the state of the vehicle is information such as the content of various data frames received from the bus 200 and the reception times thereof. Note that the analysis unit 520 may analyze the log information about the data frame detected as being anomalous and identify one or more anomalous data frames that cause anomalies of the in-vehicle network system 10 (e.g., malfunction of the vehicle). In this case, the analysis unit 520 generates FW for activating the transmission prevention function so that if a data frame similar to the data frame identified as an anomalous data frame that causes an anomaly is detected as being anomalous by the anomaly detection ECU 400, transmission of the data frame is prevented.

The FW holding unit 530 holds the FW to be delivered to the anomaly detection ECU 400.

The delivery message generation unit 540 generates a delivery message including the FW to be delivered to the anomaly detection ECU 400 and sends the delivery message to the signature processing unit 550 to generate signature data. Thus, the delivery message generation unit 540 obtains a signed delivery message and sends the signed delivery message to the communication unit 510.

The signature processing unit 550 verifies the signature of the signed anomaly detection message sent from the analysis unit 520 by using the key acquired from the key holding unit 560. Thereafter, the signature processing unit 550 notifies the analysis unit 520 of the result of verification. In addition, the signature processing unit 550 generates signature data for the delivery message notified by the delivery message generation unit 540 by using the key acquired from the key holding unit 560. Thereafter, the signature processing unit 550 transmits the generated signature data to the delivery message generation unit 540.

The key holding unit 560 holds the key used by the signature processing unit 550.

1.14 Sequence of Anomalous Frame Detection and Transmission Prevention

Figure 14:
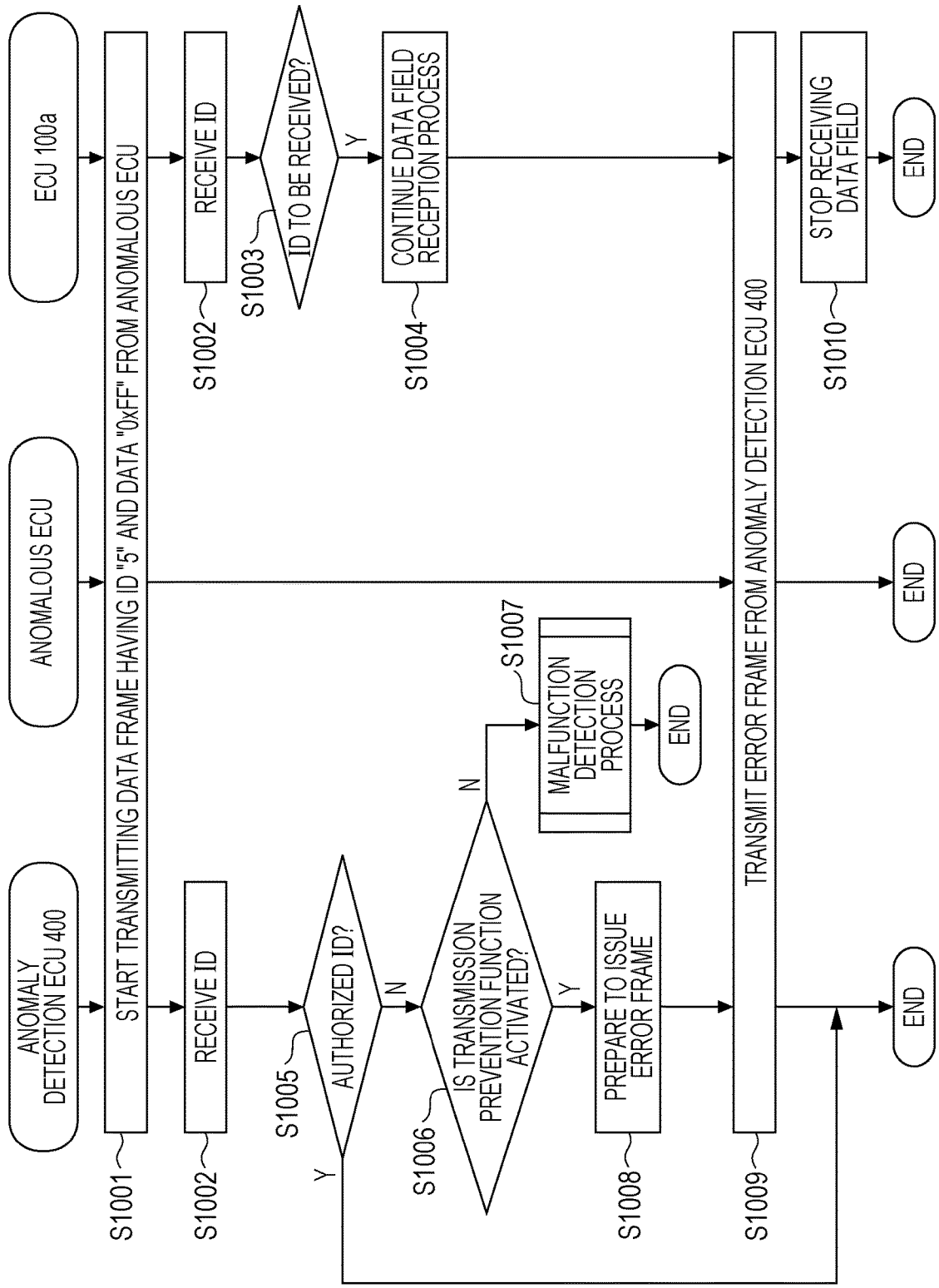
FIG. 14 is a diagram illustrating an example of a sequence of detecting and preventing transmission of an anomalous frame by the anomaly detection ECU according to the first embodiment.

FIG. 14 illustrates an example of a sequence of anomalous frame detection and prevention of transmission of an anomalous frame performed by the anomaly detection ECU 400. This example is based on the assumption that an anomalous ECU controlled by an attacker is connected to the bus 200 of the in-vehicle network system 10. In FIG. 14, the operations performed the anomaly detection ECU 400 and the ECU 100a are illustrated. However, for example, the ECUs 100b to 100d can perform the same operation as the ECU 100a. The sequence of anomalous frame detection and prevention of transmission of an anomalous frame is described below with reference to FIG. 14. Note that in this example, description is given with reference to the anomaly detection ECU 400 which holds the authorized ID list illustrated in FIG. 11.

The anomalous ECU starts transmitting the data frame having the ID "5" and the data field data "0xFF" to the bus 200 (step S1001). Note that transmission of the data frame to the bus 200 is broadcast transmission that enables all of the ECUs connected to the bus 200 to receive the data frame.

The anomaly detection ECU 400 and the ECU 100a receive the ID of the data frame (step S1002).

By using the reception ID list (refer to FIG. 5), the ECU 100a determines whether the ID received from the bus 200 is the ID of a data frame with the data field containing the content to be received (step S1003). The ECU 100a continues the data field reception process for receiving the data field of a data frame of ID "5" in accordance with the reception ID list (step S1004).

The anomaly detection ECU 400 determines whether the ID received from the bus 200 is an ID of an anomalous data frame in accordance with the authorized ID list related to the anomaly detection rule (step S1005). Since the ID "5" is not included in the authorized ID list, the anomaly detection ECU 400 determines that the data frame currently being received and having the received ID "5" is anomalous. The processing performed by the anomaly detection ECU 400 proceeds to step S1006. However, if the ID "5" is included in the authorized ID list, the anomaly detection ECU 400 determines that the data frame currently being received is not anomalous and ends the processing.

In step S1006, the anomaly detection ECU 400 refers to the management information and determines whether the transmission prevention function is activated.

If, in step S1006, it is determined that the transmission prevention function is not activated, the anomaly detection ECU 400 performs a malfunction detection process (step S1007). The malfunction detection process is described below with reference to FIG. 15.

If the anomaly detection ECU 400 holds the management information having the pieces of information illustrated in FIG. 12 as an example, the anomaly detection ECU 400 determines that prevention of transmission of the data frame with the ID "5" is permitted, that is, the transmission prevention function for the data frame is activated.

If, in step S1006, it is determined that the transmission prevention function is activated, the anomaly detection ECU 400 generates an error frame (step S1008) and transmits the error frame to the bus 200 (step S1009). As a result, since the error frame is broadcasted to the bus 200 during the reception of the data frame with the ID "5", transmission of the data frame is prevented. Note that in step S1009, transmission of the error frame to the bus 200 for preventing transmission of the data frame determined as being anomalous in step S1005 is performed before the rearmost bit of the data frame is received.

Upon receiving the error frame, the ECU 100a stops receiving the data field of the data frame currently being received (step S1010). Due to the error frame transmitted by the anomaly detection ECU 400, the reception of the data frame transmitted by the anomalous ECU is interrupted in each of the ECUs connected to the bus 200. As a result, for example, it is prevented that the ECU 100a controls the engine 310 in accordance with the content of the anomalous data frame.

1.15 Malfunction Detection Process Performed by Anomaly Detection ECU

Figure 15:
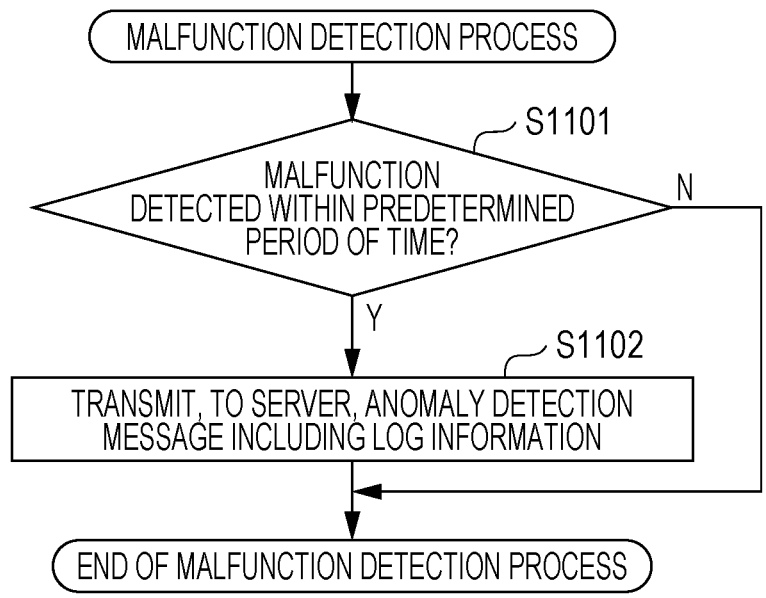
FIG. 15 is a flowchart illustrating an example of a malfunction detection process performed by the anomaly detection ECU according to the first embodiment.

FIG. 15 illustrates an example of the malfunction detection process performed by the anomaly detection ECU 400. The malfunction detection process is described below with reference to FIG. 15.

After detecting an anomalous data frame, the anomaly detection ECU 400 performs monitoring for detecting a malfunction (that is, anomaly) of the vehicle for a certain period of time (step S1101). By monitoring the vehicle for the certain period of time, log data relating to the state of the vehicle can be obtained.

An example of a malfunction of a vehicle is that although data frames having a specific ID flow in the bus 200 at substantially constant intervals normally, the data frames are not transmitted at the intervals. Another example of a malfunction of a vehicle is that the data value or the reception frequency of the data frame having a specific ID and flowing in the bus 200 differs from that defined by the specification or that of a normal data frame. The specific ID is, for example, an ID that differs from the ID of the data frame detected as being anomalous. For example, it is effective to use, as the specific ID, an ID of a data frame related to important data, such as data relating to travel control of the vehicle among data frames used in the in-vehicle network system 10. Still another example of a malfunction of a vehicle is that the operation performed by a specific ECU that constitutes the in-vehicle network system 10 differs from that defined by the specification or a normal operation, which is detected on the basis of a frame transmitted to the bus 200 by the ECU or the result of the sensing operation performed by an in-vehicle sensor.

If, in step S1101, a malfunction is detected, the anomaly detection ECU 400 sends, to the server 500 via the communication module 600, an anomaly detection message including log information (for example, log data) regarding the data frame detected as being anomalous (step S1102).

1.16 Format of Anomaly Detection Message

Figure 16:
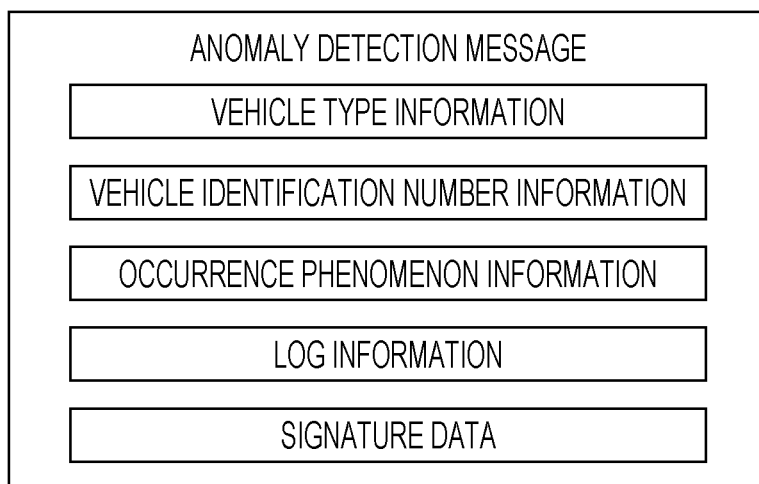
FIG. 16 is a diagram illustrating an example of the format of an anomaly detection message transmitted by the anomaly detection ECU according to the first embodiment.

FIG. 16 illustrates an example of the format of the anomaly detection message transmitted from the anomaly detection ECU 400 to the server 500. The anomaly detection message is transmitted from the anomaly detection ECU 400 to the server 500 via the communication module 600.

In the example illustrated in FIG. 16, the anomaly detection message includes the vehicle type information, the vehicle identification number information, occurrence phenomenon information, the log information, and the signature data. The occurrence phenomenon information is, for example, information indicating the type of malfunction detected. The log information includes, for example, the content of a data frame detected as being anomalous and the log data of a data frame flowing in the bus 200 for a certain period of time after reception of the data frame.

1.17 Updating Process Performed by Anomaly Detection ECU

Figure 17:
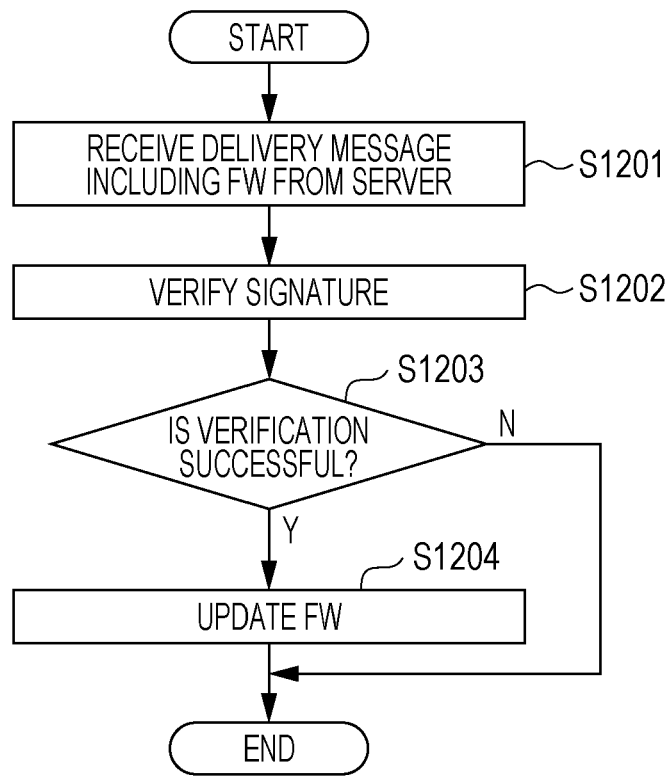
FIG. 17 is a flowchart illustrating an example of an updating process related to activation of a transmission prevention function performed by the anomaly detection ECU according to the first embodiment.

FIG. 17 illustrates an example of an updating process related to activation of the transmission prevention function performed by the anomaly detection ECU 400. The updating process is described below with reference to FIG. 17.

The communication module 600 receives a delivery message including FW for update transmitted from the server 500. The anomaly detection ECU 400 acquires the delivery message via the communication module 600 (step S1201).

Subsequently, the anomaly detection ECU 400 verifies the signature data attached to the delivery message (step S1202).

The anomaly detection ECU 400 determines whether the sender of the delivery message is the legitimate server 500 on the basis of whether the result of verification in step S1202 indicates successful verification (step S1203). If the sender is not the legitimate server 500, the updating of the FW is skipped, and the updating process is terminated.

If, in step S1203, the result of verification indicates successful verification, that is, if the sender is the legitimate server 500, the anomaly detection ECU 400 updates the FW into the FW included in the delivery message (step S1204). By updating the FW, the management information, for example, is updated. By updating the management information, the transmission prevention function, for example, can be activated. Note that in step S1204, the anomaly detection ECU 400 may determine whether the vehicle type information included in the delivery message is the same as the vehicle type of the vehicle having the currently discussed apparatus mounted therein. Only when the vehicle types are the same, the FW may be updated.

1.18 Format of Delivery Message

Figure 18:
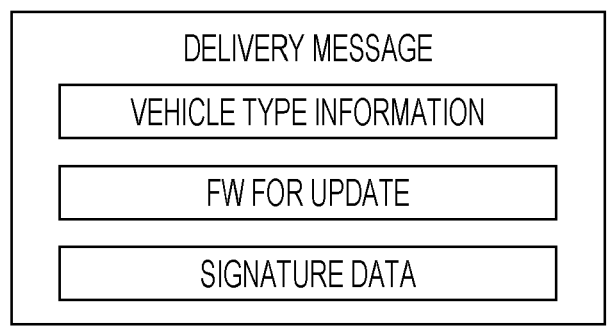
FIG. 18 is a diagram illustrating an example of the format of a delivery message including firmware (FW) transmitted by the server according to the first embodiment.

FIG. 18 illustrates an example of the format of a delivery message delivered to a vehicle by the server 500.

In the example illustrated in FIG. 18, the delivery message includes the vehicle type information indicating the type of vehicle to which the message is to be delivered, the FW for update, and the signature data. For example, the FW for update includes data or a program used to update flag information corresponding to one or more IDs in the management information (refer to FIG. 12).

1.19 Effect of First Embodiment

In the in-vehicle network system 10 of the vehicle according to the first embodiment, if the anomaly detection ECU 400 determines that a data frame flowing in the bus 200 is anomalous and if the management information indicates that the transmission prevention function is being activated, the in-vehicle network system 10 prevents transmission of the data frame. However, if the transmission prevention function is not being activated, the anomaly detection ECU 400 does not prevent transmission of the data frame. In the anomaly detection ECU 400, the transmission prevention function can be activated when a data frame is detected as being anomalous and, thereafter, the log information obtained from the vehicle for which malfunction is detected is analyzed, and FW generated by the server 500 is delivered from the server 500. The server 500 generates FW for updating the management information such that prevention of transmission of the anomalous data frame that is determined to cause malfunction is permitted. In this manner, if for example, an attack frame that causes malfunction of the vehicle is transmitted to the bus 200 by an attacker, the anomaly detection ECU 400 prevents transmission of the attack frame. In addition, according to the management information of the anomaly detection ECU 400, prevention of transmission of a data frame that does not cause an anomaly of the vehicle is not permitted and, thus, an adverse effect that arises when transmission of the data frame is mistakenly prevented can be avoided.

Second Embodiment

An in-vehicle network system 11 obtained by partially modifying the in-vehicle network system 10 of the first embodiment is described below. The in-vehicle network system 11 includes an anomaly detection ECU functioning as a frame transmission prevention apparatus capable of activating, through vehicle-to-vehicle communication, a transmission prevention function for preventing transmission of a data frame determined as being anomalous and deactivating the transmission prevention function in accordance with an instruction from a server 1500.

2.1 Configuration of Automotive Network System

Figure 19:
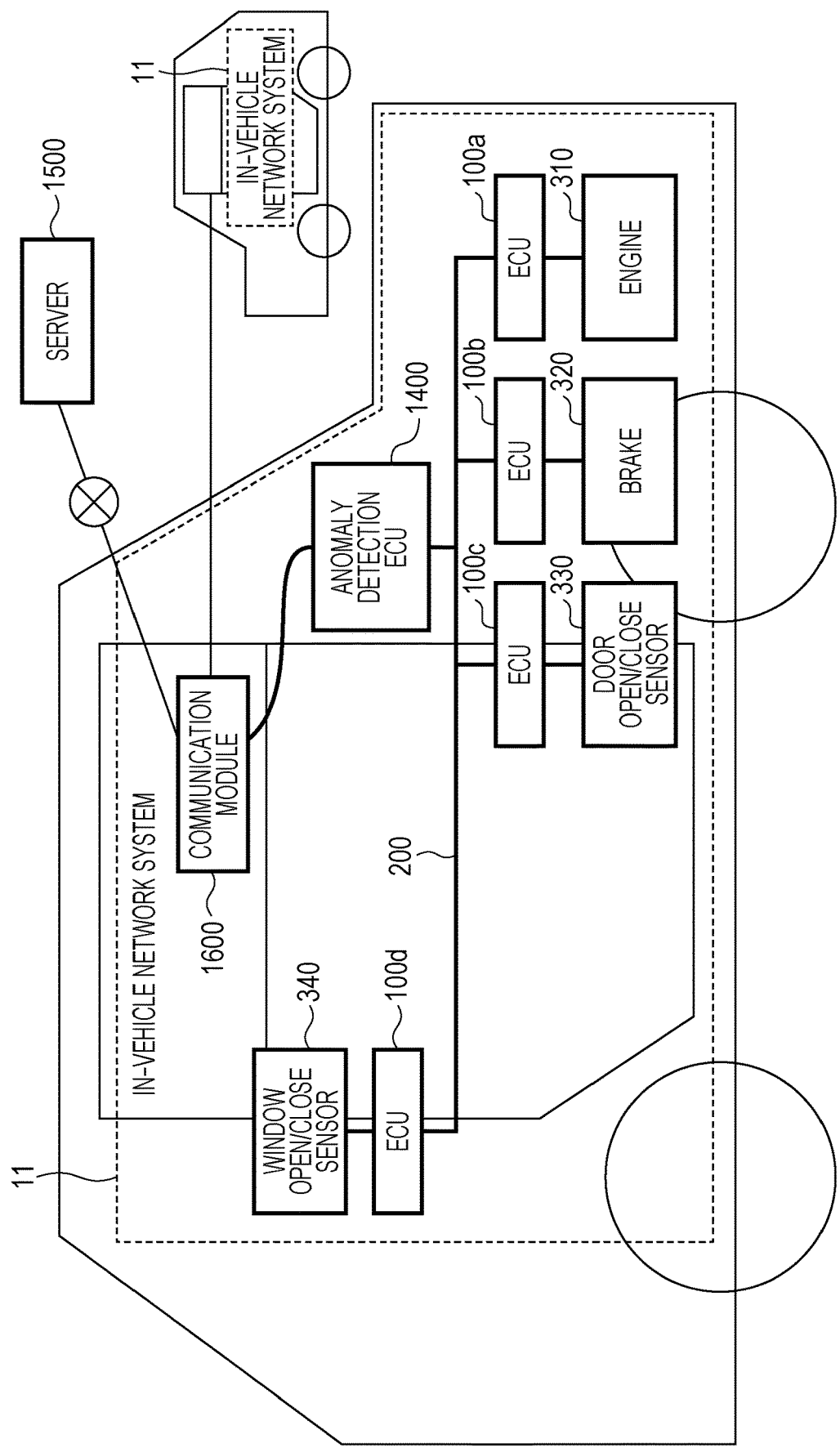
FIG. 19 is a diagram illustrating the configuration of an in-vehicle network system according to a second embodiment.

FIG. 19 is a diagram illustrating the configuration of the in-vehicle network system 11 mounted in the vehicle. Note that, in FIG. 19, other vehicles and a server 1500 outside the vehicle are also illustrated. The in-vehicle network system 11 is mounted in each of a plurality of vehicles. The server 1500 and the plurality of vehicles form a vehicle management system.

As illustrated in FIG. 19, the in-vehicle network system 11 includes a bus 200, ECUs 100*a* to 100*d* connected to the bus 200, an anomaly detection ECU 1400, and a communication module 1600. The same reference numerals are used in FIG. 19 to describe those constituent elements that are identical to the constituent elements of the first embodiment (refer to FIG. 1), and description of the constituent elements is not repeated. The constituent elements and configurations of the in-vehicle network system 11 that are not described herein are the same as those of the in-vehicle network system 10 illustrated in the first embodiment.

The anomaly detection ECU 1400 is one type of ECU connected to the bus 200. The anomaly detection ECU 1400 has a function of monitoring data frames flowing on the bus 200 and, upon detecting a data frame that meets a predetermined condition concerning a predetermined anomalous frame, performing the transmission prevention function of preventing transmission of the frame on the basis of predetermined management information. The constituent elements and configurations of the anomaly detection ECU 1400 that are not described herein are the same as those of the anomaly detection ECU 400 of the first embodiment.

The communication module 1600 mounted in the vehicle is a module including a communication circuit for communicating with the server 1500 and other vehicles. The communication module 1600 is directly connected to the anomaly detection ECU 1400 via an interface, such as a USB. The anomaly detection ECUs 1400 of all of the vehicles can exchange messages with one another through vehicle-to-vehicle communication performed between the communication modules 1600 of the vehicles. The vehicle-to-vehicle communication performed by the communication module 1600 of each of the vehicles enables a message to be transmitted to another vehicle located around the vehicle (e.g., within a distance of several tens of meters or several hundreds of meters).

The server 1500 is a computer that functions as a server apparatus located outside the vehicle. The server 1500 is capable of communicating with the plurality of vehicles. The server 500 communicates with the communication module 1600 connected to the anomaly detection ECU 400 in each of the plurality of vehicles via a wired or wireless communication network. Like the server 500 described in the first embodiment, the server 1500 has a function of transmitting, to the anomaly detection ECU 1400, a delivery message including FW for update. In addition, the server 1500 has a function of transmitting a deactivation message for deactivating the transmission prevention function of the anomaly detection ECU 1400 of the vehicle. Furthermore, the server 1500 has a function of, upon receiving an anomaly detection message from a certain vehicle, transmitting, to another vehicle, an anomaly notification message as needed. The anomaly notification message includes the vehicle type information included in the anomaly detection message and activation instruction information. Note that this function is a function of relaying the activate instruction information. The function helps the transmission of an anomaly notification message by using direct vehicle-to-vehicle communication between the vehicles.

2.2 Configuration of Anomaly Detection ECU

Figure 20:
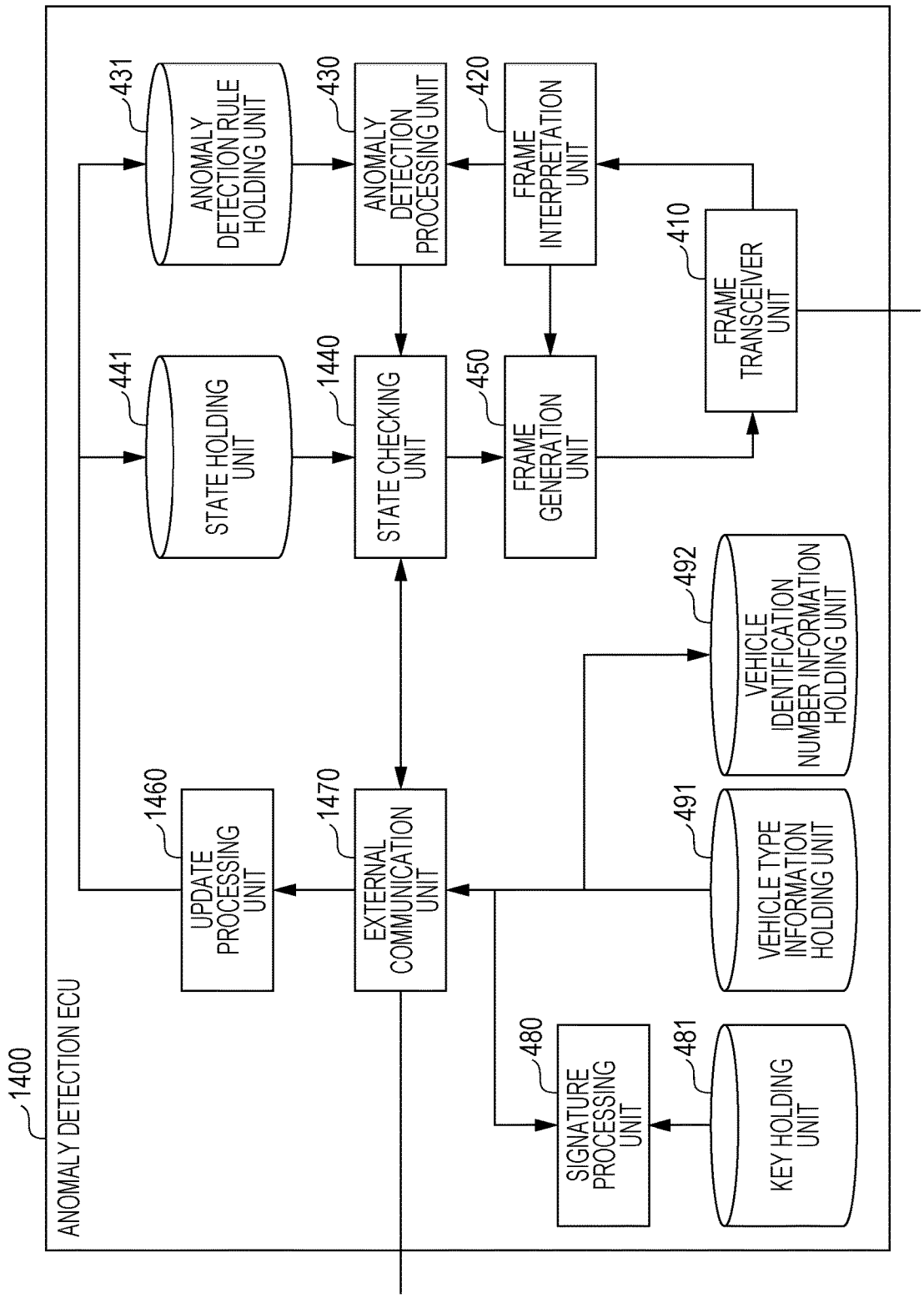
FIG. 20 is a configuration diagram of an anomaly detection ECU according to the second embodiment.

FIG. 20 is a configuration diagram of the anomaly detection ECU 1400. The anomaly detection ECU 1400 includes a frame transceiver unit 410, a frame interpretation unit 420, an anomaly detection processing unit 430, an anomaly detection rule holding unit 431, a state checking unit 1440, a state holding unit 441, a frame generation unit 450, an updating processing unit 1460, an external communication unit 1470, a signature processing unit 480, a key holding unit 481, a vehicle type information holding unit 491, and a vehicle identification number information holding unit 492. The functions of these constituent elements are provided by, for example, the communication circuit and one of the processor that executes a program stored in the memory and the digital circuit in the anomaly detection ECU 1400. The same reference numerals are used in FIG. 20 to describe those constituent elements that have functions identical to those of the anomaly detection ECU 400 according to the first embodiment (refer to FIG. 10), and description of the constituent elements is not repeated.

The state checking unit 1440 is a modification of the state checking unit 440 illustrated in the first embodiment. If an anomalous data frame is detected with the transmission prevention function activated, the state checking unit 1440 instructs the frame generation unit 450 to transmit an error frame. If an anomalous data frame is detected with the transmission prevention function not activated, the state checking unit 1440 checks the state of the vehicle. If, in the checking, an anomaly, such as malfunction, is detected, the state checking unit 1440 sends, to the external communication unit 470, the log information about the data frame detected as being anomalous for transmission to the server 1500 and activation instruction information for activating the transmission prevention function of the frame transmission prevention apparatus of another vehicle. The activation instruction information includes an activation command indicating that the instruction information is an instruction for activating the transmission prevention function and target frame information for identifying the ID of the data frame detected as being anomalous, that is, the ID for which the transmission prevention function is to be activated.

In addition to the functions that are the same as those of the updating processing unit 460 described in the first embodiment, the updating processing unit 1460 has a function of, upon receiving the activation instruction information relating to the activation state of the transmission prevention function or deactivation instruction information from the external communication unit 1470, updating management information in response to the instruction information. Note that the deactivation instruction information includes a deactivation command indicating that the instruction information is an instruction for deactivating prevention of transmission and target frame information for identifying the ID of a data frame for which prevention of transmission is not to be performed. The transmission prevention function activation process that relates to updating of the management information corresponding to the activation instruction information and that is performed by the updating processing unit 1460 is achieved by changing the flag information corresponding to the ID indicated by the target frame information to a value indicating the state in which the transmission prevention function is activated, that is, the state in which prevention of transmission is permitted. The transmission prevention function deactivation process that relates to updating of the management information corresponding to the deactivation instruction information and that is performed by the updating processing unit 1460 is achieved by changing the flag information corresponding to the ID indicated by the target frame information to a value indicating the state in which the transmission prevention function is not activated, that is, the state in which prevention of transmission is not permitted.

The external communication unit 1470 is a modification of the external communication unit 470 described in the first embodiment. The external communication unit 1470 communicates with the server 1500 via the communication module 1600 and acquires a delivery message, an anomaly notification message, or a deactivation message. The external communication unit 1470 sends the acquired delivery message to the signature processing unit 480 and acquires the result of verification of the signature of the delivery message. If the verification is successful, the external communication unit 1470 sends the FW in the delivery message to the updating processing unit 1460. The external communication unit 1470 sends, to the signature processing unit 480, the acquired anomaly notification message and acquires the result of verification of the signature of the anomaly notification message. If the verification is successful and if the vehicle type information is the same as the type of vehicle having the currently discussed apparatus mounted therein, the external communication unit 1470 sends, to the updating processing unit 1460, the activation instruction information in the anomaly notification message. The external communication unit 1470 sends the acquired deactivation message to the signature processing unit 480 and acquires the result of verification of the signature of the deactivation message. If verification is successful, the external communication unit 1470 sends, to the updating processing unit 1460, deactivation instruction information in the deactivation message. Note that in the vehicle management system, predetermined authority to transmit a deactivation message for deactivating the transmission prevention function is given to, for example, the server 1500, but not given to the vehicle. Therefore, in the verification of the signature of the deactivation message, it is useful to verify that the signature data related to the server 1500 having the predetermined authority is attached to the deactivation message.

In addition, the external communication unit 1470 adds the vehicle type information acquired from the vehicle type information holding unit 491 and the vehicle identification number information acquired from the vehicle identification number information holding unit 492 to the log information and the activation instruction information related to the data frame notified by the state checking unit 1440 and generates an unsigned anomaly detection message. The anomaly detection message is obtained by adding the activation instruction information to the anomaly detection message described in the first embodiment. The external communication unit 1470 sends, to the signature processing unit 480, the unsigned anomaly detection message and acquires the signature data. Thus, the external communication unit 1470 converts the unsigned anomaly detection message into a signed anomaly detection message and transmits the signed anomaly detection message to the server 1500 via the communication module 1600. In addition, the external communication unit 1470 adds the vehicle type information acquired from the vehicle type information holding unit 491 and the vehicle identification number information acquired from the vehicle identification number information holding unit 492 to the activation instruction information notified by the state checking unit 1440 and generates an unsigned anomaly notification message. The external communication unit 1470 sends, to the signature processing unit 480, the unsigned anomaly notification message and acquires the signature data. Thus, the external communication unit 1470 converts the unsigned anomaly notification message into a signed anomaly notification message and transmits the signed anomaly notification message to another vehicle via the communication module 1600.

2.3 Configuration of Server

The server 1500 includes, for example, a memory, a recording medium, such as a hard disk, a processor, and a communication circuit.

Figure 21:
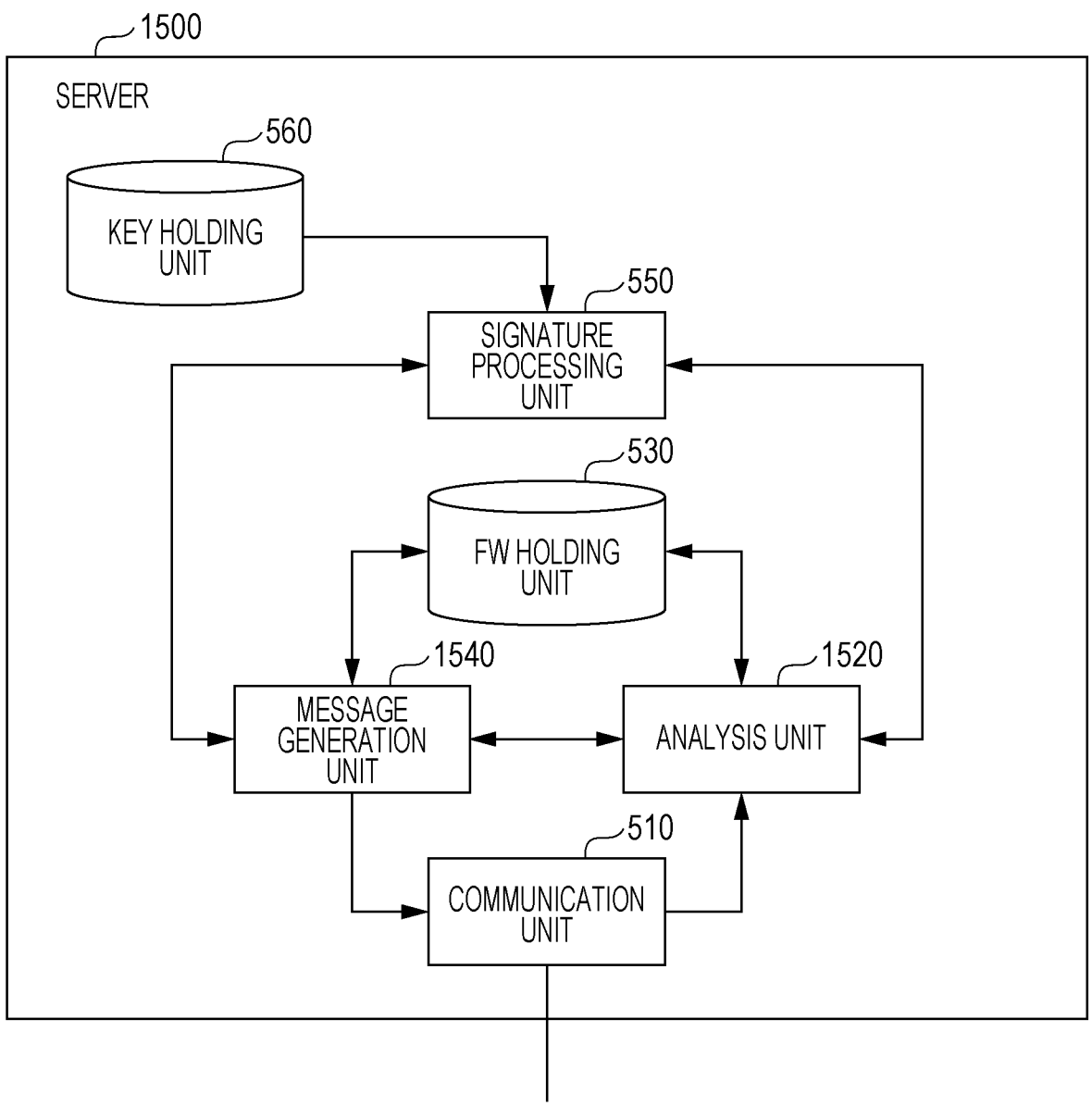
FIG. 21 is a configuration diagram of a server according to the second embodiment.

FIG. 21 is a configuration diagram of the server 1500. The server 1500 includes a communication unit 510, an analysis unit 1520, an FW holding unit 530, a message generation unit 1540, a signature processing unit 550, and a key holding unit 560 as functional constituent elements. Each of the constituent elements is implemented by, for example, a communication circuit, a processor that executes a program stored in the memory in the server 1500. The same reference numerals are used in FIG. 21 to describe those constituent elements that have functions identical to those of the server 500 according to the first embodiment (refer to FIG. 13), and description of the constituent elements is not repeated as appropriate.

The communication unit 510 transmits a delivery message, a deactivation message, or an anomaly notification message transmitted from the message generation unit 1540 to a vehicle. The messages are received by the communication module 1600 of the vehicle and are transmitted to the anomaly detection ECU 1400. In addition, the communication unit 510 receives the anomaly detection message transmitted from the anomaly detection ECU 1400 of the vehicle via the communication module 1600 and sends the anomaly detection message to the analysis unit 1520.

The analysis unit 1520 sends, to the signature processing unit 550, the received anomaly detection message and acquires the result of verification of the signature of the anomaly detection message. In addition, the analysis unit 1520 analyzes the log information regarding the data frame detected as being anomalous, which is included in the analysis information serving as the anomaly detection message for which the signature verification is successful. Thus, the analysis unit 1520 determines whether the data frame is an anomalous data frame that causes an anomaly on the in-vehicle network system 11, such as malfunction of the vehicle. If the analysis unit 1520 determines that the data frame detected as being anomalous is an anomalous data frame that causes an anomaly, the analysis unit 1520 generates FW for activating the transmission prevention function that prevents a similar data frame from being transmitted when the data frame is detected as being anomalous by the anomaly detection ECU 1400. The analysis unit 1520 instructs the FW holding unit 530 to hold the generated FW. In addition, if the analysis unit 1520 determines that the data frame detected as being anomalous is an anomalous data frame that causes an anomaly, the analysis unit 1520 sends, to the message generation unit 1540, the activation instruction information and the vehicle type information included in the anomaly detection message. However, if the analysis unit 1520 determines that the data frame detected as being anomalous is not an anomalous data frame that causes an anomaly, the analysis unit 1520 sends, to the message generation unit 1540, the deactivation instruction information in order to deactivate the transmission prevention function that when a similar data frame is detected as being anomalous by the anomaly detection ECU 1400, prevents transmission of the data frame. In consideration of the influence of the data frame detected as being anomalous, the analysis unit 1520 may make the determination on the basis of, for example, the information collected from the plurality of vehicles. Note that the analysis unit 1520 sets, in the deactivation instruction information to be sent to the message generation unit 1540, the target frame information indicating the ID of the data frame for which the transmission prevention function is to be deactivated.

The FW holding unit 530 holds the FW to be delivered to the anomaly detection ECU 1400.

The message generation unit 1540 generates a delivery message including the FW to be delivered to the anomaly detection ECU 1400 and sends the delivery message to the signature processing unit 550 to generate the signature data. Thus, the message generation unit 1540 receives the signed delivery message and sends the signed delivery message to the communication unit 510. In addition, upon receiving notification of the activation instruction information and the vehicle type information from the analysis unit 1520, the message generation unit 1540 generates an anomaly notification message including the activation instruction information and the vehicle type information. Thereafter, the message generation unit 1540 sends, to the signature processing unit 550, the anomaly notification message to instruct the signature processing unit 550 to generate signature data. Thus, the message generation unit 1540 obtains a signed anomaly notification message and sends the signed anomaly notification message to the communication unit 510. Upon receiving the notification of the deactivation instruction information from the analysis unit 1520, the message generation unit 1540 generates a deactivation message including the deactivation instruction information and sends the deactivation message to the signature processing unit 550, which generates the signature data. Thereafter, the message generation unit 1540 acquires a signed deactivation message and sends the signed deactivation message to the communication unit 510.

The signature processing unit 550 verifies the signature of the signed anomaly detection message sent from the analysis unit 1520 by using the key acquired from the key holding unit 560 and sends the result of verification to the analysis unit 1520. In addition, the signature processing unit 550 generates signature data for the delivery message, the anomaly notification message, or the deactivation message sent from the message generation unit 1540 by using the key obtained from the key holding unit 560. Thereafter, the signature processing unit 550 sends the generated signature data to the message generation unit 1540.

2.4 Sequence of Detection of Anomalous Frame and Prevention of Transmission

Figure 22:
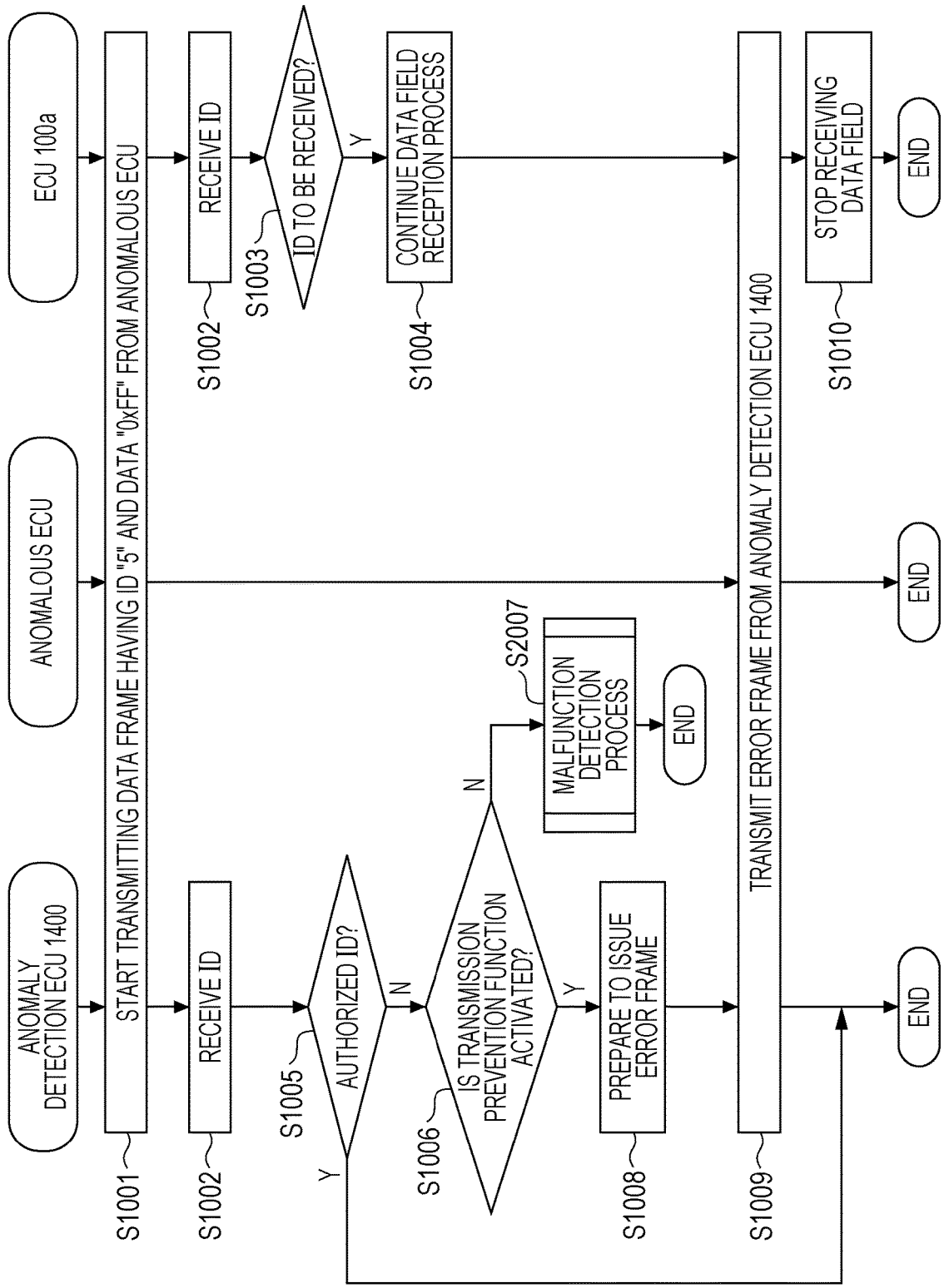
FIG. 22 is a diagram illustrating an example of a sequence of detecting and preventing transmission of an anomalous frame performed by the anomaly detection ECU according to the second embodiment.

FIG. 22 illustrates an example of a sequence of detection of an anomalous frame and prevention of transmission of the anomalous frame performed by the anomaly detection ECU 1400. This example is based on the assumption that an anomalous ECU controlled by an attacker is connected to the bus 200 of the in-vehicle network system 11. In FIG. 22, the operations performed by the anomaly detection ECU 1400 and the ECU 100a are illustrated. However, for example, the ECUs 100b to 100d can perform the same operation as the ECU 100a. Note that the same reference numerals are used in FIG. 22 to describe steps of the processing that are identical to those of the first embodiment illustrated in FIG. 14, and description of the steps is not repeated as appropriate.

The anomalous ECU starts transmission of a data frame having ID "5" and data of "0xFF" (step S1001), and the anomaly detection ECU 1400 receives the ID of the data frame (step S1002).

The anomaly detection ECU 1400 determines whether the ID received from the bus 200 is an ID of an anomalous data frame according to the authorized ID list (refer to FIG. 11) related to the anomaly detection rule (step S1005). Since the ID "5" is not included in the authorized ID list, the anomaly detection ECU 1400 determines that the data frame with the received ID "5" which is currently being received is anomalous. Subsequently, the anomaly detection ECU 1400 refers to the management information and determines whether the transmission prevention function is activated (step S1006).

If, in step S1006, it is determined that the transmission prevention function is activated, the anomaly detection ECU 1400 performs a malfunction detection process (step S2007). The malfunction detection process is described below with reference to FIG. 23.

If, in step S1006, it is determined that the transmission prevention function is activated, the anomaly detection ECU 1400 generates and transmits an error frame (steps S1008 and S1009).

2.5 Malfunction Detection Process Performed by Anomaly Detection ECU

Figure 23:
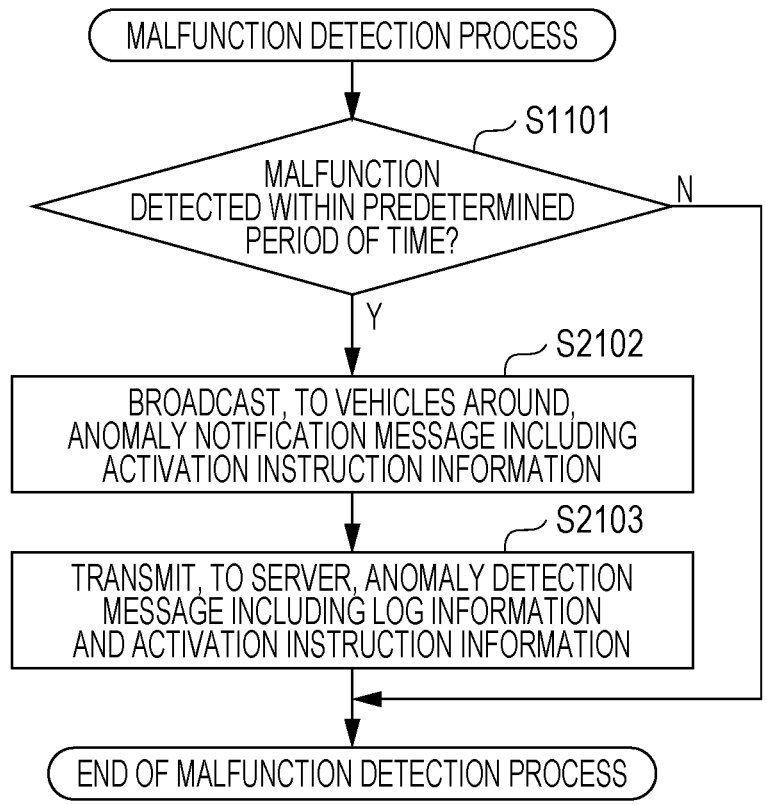
FIG. 23 is a flowchart illustrating an example of a malfunction detection process performed by the anomaly detection ECU according to the second embodiment.

FIG. 23 illustrates an example of the malfunction detection process performed by the anomaly detection ECU 1400. Note that the same reference numerals are used in FIG. 23 to describe steps of the processing that are identical to those of the first embodiment illustrated in FIG. 15, and description of the steps is not repeated as appropriate. The malfunction detection process is described below with reference to FIG. 23.

After detecting an anomalous data frame, the anomaly detection ECU 1400 performs monitoring to detect a malfunction (that is, anomaly) of the vehicle for a certain period of time (step S1101). By monitoring the vehicle for a certain period of time, log data relating to the state of the vehicle can be obtained.

If, in step S1101, a malfunction is detected, the anomaly detection ECU 1400 transmits, to the vehicles around via the communication module 1600, an anomaly notification message (refer to FIG. 24) including the activation instruction information, such as the target frame information indicating the ID of the data frame detected as being anomalous through vehicle-to-vehicle communication (step S2102).

Immediately after the process in step S2102, the anomaly detection ECU 1400 transmits, to the server 1500 via the communication module 1600, an anomaly detection message (refer to FIG. 25) including the log information (e.g., log data) relating to the data frame detected as being anomalous and activation instruction information (Step S2103).

2.6 Format of Anomaly Notification Message

Figure 24:
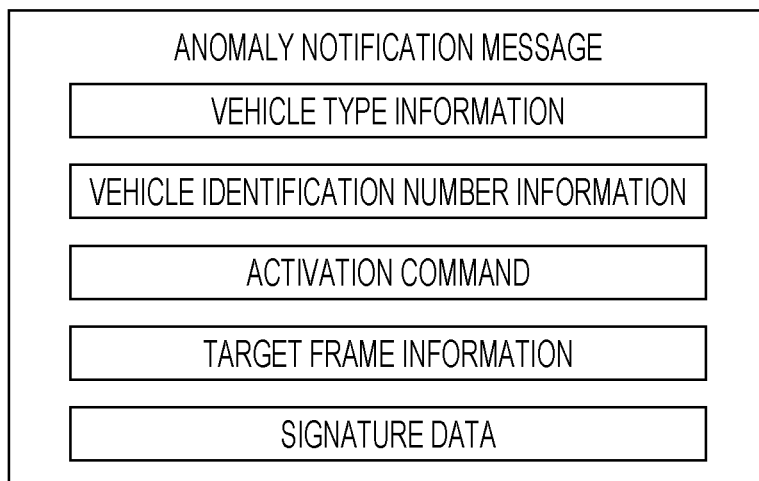
FIG. 24 is a diagram illustrating an example of the format of an anomaly notification message transmitted by the anomaly detection ECU through vehicle-to-vehicle communication according to the second embodiment.

FIG. 24 illustrates an example of the format of an anomaly notification message transmitted to the vehicles around by the anomaly detection ECU 1400 of the vehicle using the communication module 1600. In addition, the anomaly notification message can be transmitted by the server 1500 under certain conditions.

In the example illustrated in FIG. 24, the anomaly notification message includes the vehicle type information, the vehicle identification number information, an activation instruction information (that is, an activation command and the target frame information), and signature data. For example, the target frame information in the anomaly notification message indicates a predetermined ID. In this case, the activation instruction information indicates an instruction to permit prevention of transmission of a frame having the predetermined ID.

2.7 Format of Anomaly Detection Message

Figure 25:
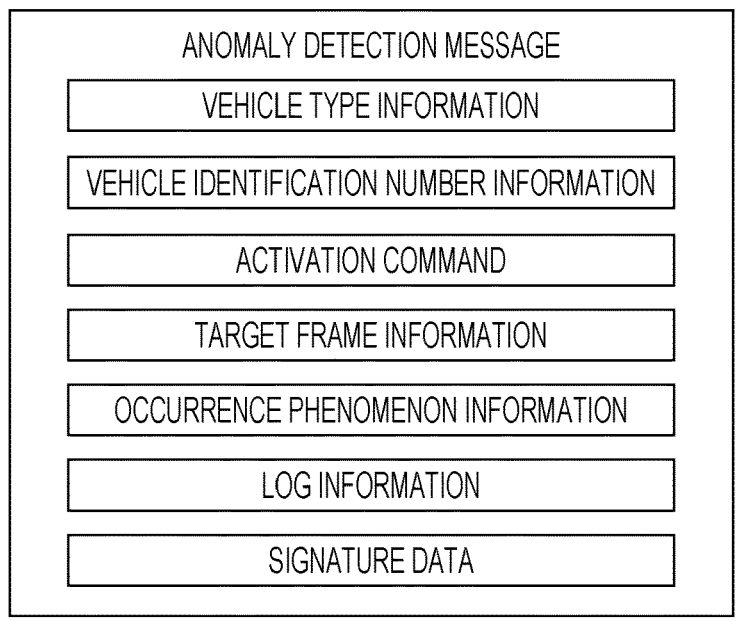
FIG. 25 is a diagram illustrating an example of the format of an anomaly detection message transmitted to a server by the anomaly detection ECU according to the second embodiment.

FIG. 25 illustrates an example of the format of the anomaly detection message transmitted from the anomaly detection ECU 1400 to the server 1500. The anomaly detection message is transmitted from the anomaly detection ECU 1400 to the server 1500 via the communication module 1600.

In the example illustrated in FIG. 25, the anomaly detection message includes the vehicle type information, the vehicle identification number information, activation instruction information (that is, an activation command and the target frame information), the occurrence phenomenon information, the log information, and signature data. This anomaly detection message is obtained by adding the activation instruction information to the anomaly detection message (refer to FIG. 16) described in the first embodiment.

Figure 26:
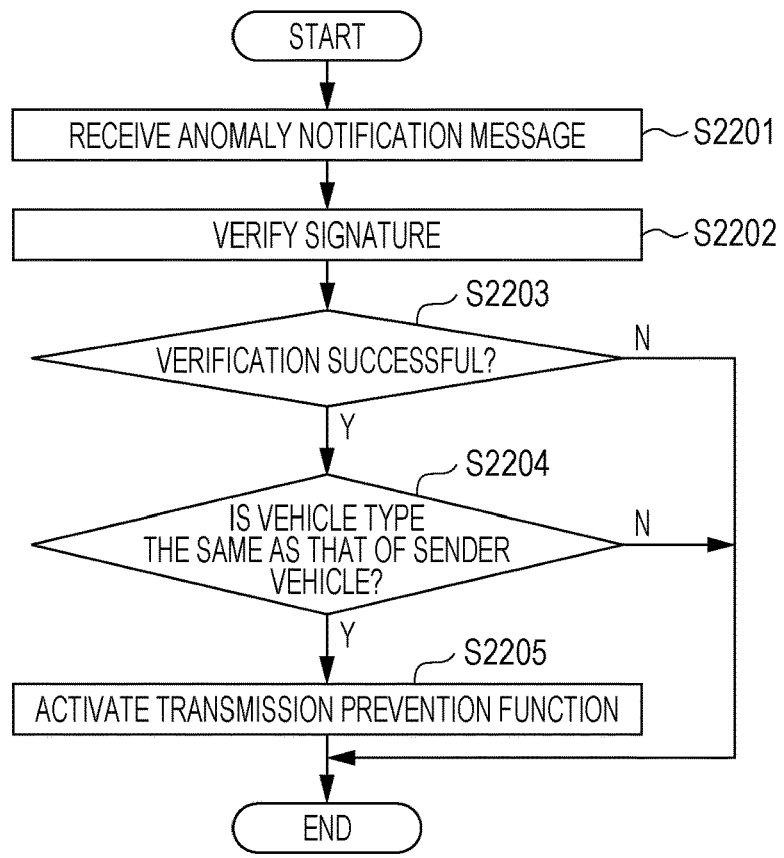
FIG. 26 is a flowchart illustrating an example of a transmission prevention function activation process performed by the anomaly detection ECU according to the second embodiment.

2.8 Transmission Prevention Function Activation Process Performed by Anomaly Detection ECU FIG. 26 illustrates an example of the transmission prevention function activation process performed by the anomaly detection ECU 1400. The transmission prevention function activation process is described below with reference to FIG. 26.

The anomaly detection ECU 1400 acquires the anomaly notification message transmitted by another vehicle or the server 1500 via the communication module 1600 for reception (step S2201).

Subsequently, the anomaly detection ECU 1400 verifies the signature data attached to the anomaly notification message (step S2202).

The anomaly detection ECU 1400 determines whether the sender of the anomaly notification message is the legitimate server 1500 or an authorized vehicle on the basis of whether the result of verification in step S2202 indicates successful verification (step S2203). If the verification fails, activation of the transmission prevention function is skipped, and the transmission prevention function activation process is terminated.

If, in step S2203, the result of verification indicates successful verification, that is, if the sender is the legitimate server 1500 or an authorized vehicle, the anomaly detection ECU 1400 determines whether the vehicle type is the same as the vehicle type of the vehicle having the currently discussed apparatus mounted therein on the basis of the vehicle type information in the anomaly notification message (step S2204). If the vehicle types are not the same, the anomaly detection ECU 1400 ends the transmission prevention function activation process.

If, in step S2204, it is determined that the vehicle types are the same, the anomaly detection ECU 1400 activates the transmission prevention function in accordance with the activation instruction information in the anomaly notification message (step S2205). The anomaly detection ECU 1400 performs the activation by setting the flag information corresponding to the ID indicated by the target frame information in the activation instruction information of the management information to a value indicating permission of prevention of frame transmission.

2.9 Transmission of Deactivation Message Performed by Server

Figure 27:
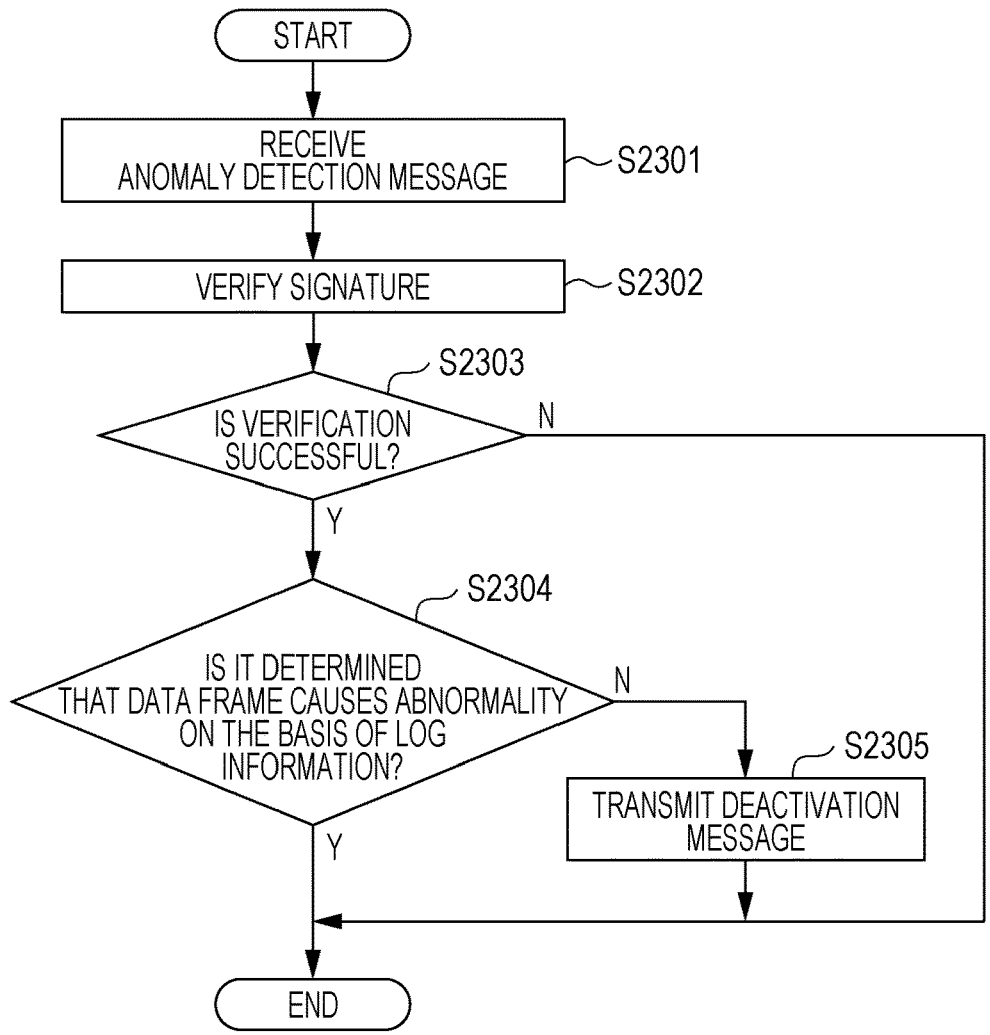
FIG. 27 is a flowchart illustrating an example of a process relating to transmission of a deactivation message performed by a server according to a second embodiment.

FIG. 27 illustrates an example of the process relating to transmission of a deactivation message performed by the server 1500. The deactivation message is a message for deactivating the transmission prevention function of the anomaly detection ECU 1400.

The server 1500 receives an anomaly detection message from the anomaly detection ECU 1400 of a vehicle (step S2301).

Subsequently, the server 1500 verifies the signature data attached to the anomaly detection message (step S2302).

The server 1500 determines whether the sender of the anomaly detection message is an authorized vehicle on the basis of whether the result of verification in step S2302 indicates successful verification (step S2303). If the sender is not an authorized vehicle, the server 500 terminates the process without sending a deactivation message or the like.

If, in step S2303, the result of verification indicates successful verification, that is, if the sender is an authorized vehicle, the server 1500 determines whether the data frame detected as being anomalous is an anomalous data frame that causes an anomaly on the basis of, for example, the log information in the anomaly detection message (step S2304). This determination is made to confirm whether an anomaly is caused. If, in step S2304 it is determined that an anomaly is not caused, the server 1500 transmits a deactivation message (refer to FIG. 28) including the deactivation instruction information used to deactivate the transmission prevention function that prevents transmission of a data frame when the data frame is detected as being anomalous by the anomaly detection ECU 1400 (step S2305). The server 1500 may employ any method to determine whether an anomaly is caused or not. The server 1500 can employ a method that determines that an anomaly is not caused if, on the basis of the log information, an anomaly is not found in the content of each of one or more important data frames predetermined in the in-vehicle network system 11 or transmission intervals between the data frames before a predetermined period of time elapses after detection of an anomalous data frame. Alternatively, the server 1500 can employ a method that determines that an anomaly is not caused if, on the basis of the log information, one or more particular ECUs that constitute the in-vehicle network system 11 and that relate to travel control of the vehicle operate normally until a predetermined period of time elapses after detection of an anomalous data frame. Still alternatively, as an example, the server 1500 can employ a method that determines that an anomaly is not caused if, on the basis of the log information, messages of the same type are not received before a predetermined relatively sufficient period of time elapses after detection of an anomalous data frame.

If, in step S2304, it is determined that an anomaly is caused, the server 1500 does not transmit the deactivation message. In addition, if, in step S2304 it is determined that the anomaly is caused, the server 1500 can transmit a delivery message including FW for activating the transmission prevention function, for example.

2.10 Format of Deactivation Message

Figure 28:
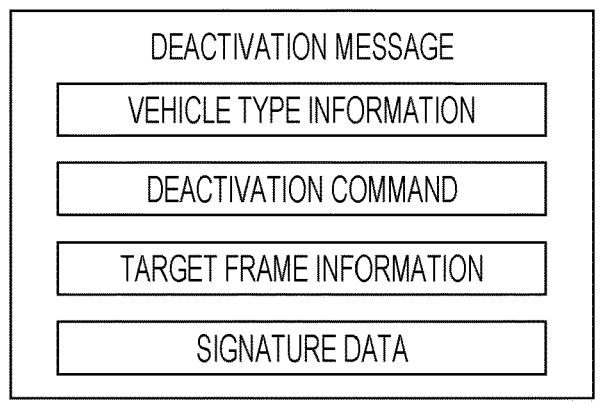
FIG. 28 is a diagram illustrating an example of the format of the deactivation message transmitted by the server according to the second embodiment.

FIG. 28 illustrates an example of the format of the deactivation message transmitted from the server 1500 to a vehicle. The deactivation message is received by the anomaly detection ECU 1400 of the vehicle via the communication module 1600.

In the example illustrated in FIG. 28, the deactivation message includes the vehicle type information, the deactivation instruction information (that is, a deactivation command and the target frame information), and signature data. For example, the target frame information in the deactivation message indicates a predetermined ID. In this case, the deactivation instruction information indicates an instruction not to permit prevention of transmission of a frame having the predetermined ID.

Figure 29:
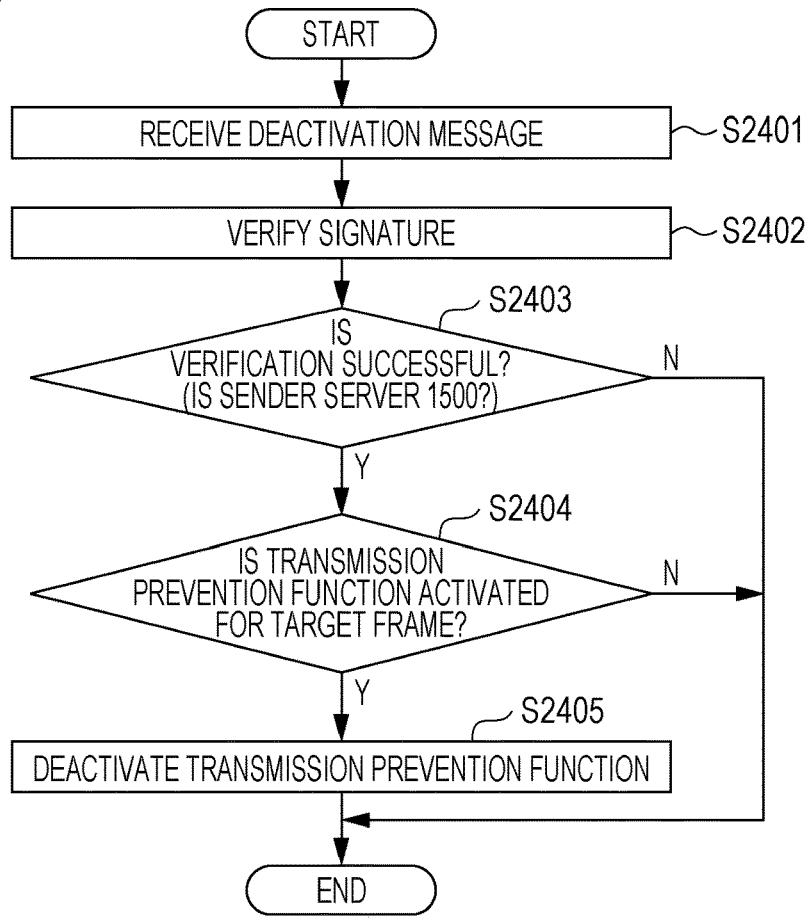
FIG. 29 is a flowchart illustrating an example of a transmission prevention function deactivation process performed by the anomaly detection ECU according to the second embodiment.

2.11 Transmission Prevention Function Deactivation Process Performed by Anomaly Detection ECU FIG. 29 illustrates an example of the transmission prevention function deactivation process performed by the anomaly detection ECU 1400. The transmission prevention function deactivation process is described below with reference to FIG. 29.

The anomaly detection ECU 1400 receives a deactivation message via the communication module 1600 (step S2401).

Subsequently, the anomaly detection ECU 1400 verifies the signature data attached to the deactivation message (step S2402).

The anomaly detection ECU 1400 determines whether the sender of the deactivation message is the legitimate server 1500 on the basis of whether the result of verification in step S2402 indicates successful verification (step S2403). If the verification fails, the anomaly detection ECU 1400 skips deactivation of the transmission prevention function and terminates the transmission prevention function deactivation process.

If, in step S2403, the result of verification indicates successful verification, that is, if authentication which checks whether the sender is the server 1500 having a predetermined authority to send a deactivation message is successful, the anomaly detection ECU 1400 determines whether the transmission prevention function is activated for the target frame on the basis of the target frame information in the deactivation instruction information and the flag information in the management information (step S2404). If it is determined that the transmission prevention function is not activated, the anomaly detection ECU 1400 ends the transmission prevention function deactivation process.

However, if, in step S2404, it is determined that the transmission prevention function is activated, the anomaly detection ECU 1400 deactivates the transmission prevention function (step S2405). The anomaly detection ECU 1400 performs the deactivation by setting the flag information corresponding to the ID indicated by the target frame information in the deactivation instruction information of the management information to a value indicating that transmission of the frame is not permitted.

2.12 Effect of Second Embodiment

According to the in-vehicle network system 11 of a vehicle of the second embodiment, if the anomaly detection ECU 1400 determines that a data frame flowing in the bus 200 is anomalous and if the management information indicates that the transmission prevention function is activated, transmission of the data frame is prevented. However, if the transmission prevention function is not activated, the anomaly detection ECU 1400 does not prevent transmission of the data frame. If the data frame is detected as being anomalous and if malfunction of the vehicle is detected, the anomaly detection ECU 1400 of the vehicle transmits an anomaly notification message to other vehicles. As a result, in other vehicles, the transmission prevention function for data frames detected as being anomalous is activated and, thus, protection against an attack by an attacker can be carried out immediately. In this manner, simultaneous attacks against a local vehicle group by an attacker can be defended immediately. In addition, the server 1500 transmits a deactivation message to deactivate the transmission prevention function performed by the anomaly detection ECU 1400 of the vehicle for a data frame that is determined not to cause any anomaly in a comprehensive manner. The server 1500 has predetermined authority to transmit a deactivation message. The security is increased by allowing only the server 1500 having the predetermined authority to deactivate the transmission prevention function once activated in the vehicle.

Other Embodiments

While the first and second embodiments have been described above as examples of the technique according to the present disclosure, the technique according to the present disclosure is not limited thereto. The technique can be further applied to embodiments for which changes, substitutions, additions, deletion, etc. are made as appropriate. For example, the modifications described below are also encompassed within an aspect of the present disclosure.

(1) While the above embodiments have been described with reference to the communication module 600, 1600 directly connected to the anomaly detection ECU, the communication module 600, 1600 may be a communication module ECU connected to the CAN bus 200. In this case, the anomaly detection ECU may exchange message with the server 500, 1500 or another vehicle via the communication module ECU by exchanging messages with the communication module ECU via the bus 200. Alternatively, the communication module 600, 1600 may be provided as a communication unit in the anomaly detection ECU 400, 1400.

Figure 30:
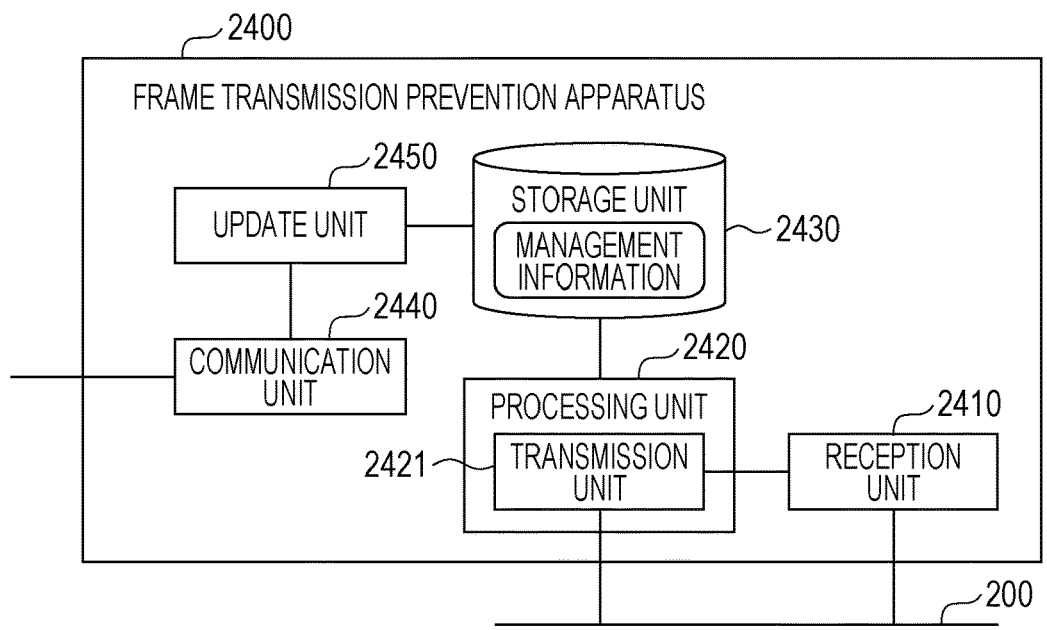
FIG. 30 is a configuration diagram of a frame transmission prevention apparatus according to a modification.

(2) While the above embodiments have been described with reference to an example in which the anomaly detection ECU 400, 1400 serving as a frame transmission prevention apparatus exchanges messages with the server 500, 1500 outside the vehicle or other vehicles via the communication module 600, 1600, the frame transmission prevention apparatus may include a communication circuit that communicates with the outside of the vehicle and may perform communication with the server 500 or the like via the communication circuit. An example of such a frame transmission prevention apparatus is illustrated in FIG. 30. As illustrated in FIG. 30, a frame transmission prevention apparatus 2400 is mounted in, for example, a vehicle and is connected to the bus 200 of the in-vehicle network system 10, 11, etc. (refer to FIGS. 1 and 19). The frame transmission prevention apparatus 2400 includes, for example, a processor, an integrated circuit, such as a memory, and a communication circuit. Functionality wise, the frame transmission prevention apparatus 2400 includes, for example, a reception unit 2410, a processing unit 2420, a storage unit 2430, a communication unit 2440, and an update unit 2450. The reception unit 2410 includes a communication circuit and the like. The reception unit 2410 receives a frame from the bus 200. The reception unit 2410 corresponds to a unit that provides the reception function of the frame transceiver unit 110 described above. The processing unit 2420 is implemented by, for example, a processor that executes a program stored in a memory, a communication circuit, and the like. If the frame received by the reception unit 2410 satisfies a predetermined condition, the processing unit 2420 switches whether to perform a predetermined process for preventing transmission of the frame on the basis of the management information indicating whether prevention of transmission of the frame is permitted. For example, the processing unit 2420 may include the anomaly detection processing unit 430 and the state checking unit 440, 1440 described above. The predetermined condition is, for example, a condition for detecting an anomalous frame. The predetermined condition can be, for example, a condition regarding the ID of the frame, and can be a condition that is satisfied when the ID is not listed in the authorized ID list illustrated in FIG. 11, for example. The processing unit 2420 includes a transmission unit 2421 and can perform, as the above-mentioned predetermined process, a process of transmitting an error frame to the bus 200 before receiving the rearmost bit of the frame that satisfies the predetermined condition by the reception unit 2410. The processing unit 2420 may perform, as the predetermined process for preventing transmission of a frame, a process of transmitting, to the bus 200, dominant signals less in number than the dominant signals constituting an error frame while the frame is being transmitted. When the content of the frame on the bus 200 is altered by the dominant signals and, thus, a reception error, such as a CRC error, or the like occurs, it can be prevented that the ECU of the receiving node processes the frame in the same manner as a normal frame. The frame transmission prevention apparatus 2400 may be a gateway apparatus having a transfer function of connecting a plurality of buses to one another and forwarding a data frame received from one bus to another bus. In this case, the processing unit 2420 can perform, as the predetermined process of preventing transmission of a frame, a process of preventing forwarding of a frame. The storage unit 2430 stores the management information in part of the area of a recording medium, such as a memory. For example, the storage unit 2430 corresponds to the above-described state holding unit 441 or the like. The communication unit 2440 includes, for example, a wireless communication circuit or the like. The communication unit 2440 communicates with external apparatuses, such as a server apparatus located outside the vehicle and an apparatus mounted in another vehicle. For example, the communication unit 2440 can transmit an anomaly notification message for other vehicles (refer to FIG. 24) and the like. The update unit 2450 includes, for example, a processor that executes a program and updates the management information stored in the storage unit 2430. The update unit 2450 may include, for example, the updating processing unit 460, 1460 described above. The management information in the storage unit 2430 may include, for each of the IDs, flag information indicating whether to permit prevention of transmission of a frame that has the ID and that satisfies the predetermined condition. Accordingly, if the frame received by the reception unit 2410 satisfies the predetermined condition and if the flag information corresponding to the ID of the frame indicates that prevention of transmission of the frame is permitted, the processing unit 2420 may perform the predetermined process. However, if the flag information corresponding to the ID of the frame indicates that prevention of transmission of the frame is not permitted, the processing unit 2420 may not perform the predetermined process. In addition, the update unit 2450 may update the management information in accordance with the instruction information received by the frame transmission prevention apparatus 2400 from, for example, an anomaly monitoring ECU connected to the bus 200 or from an external apparatus or the like located outside the vehicle. The instruction information may be, for example, activation instruction information or deactivation instruction information described in the above embodiments.

(3) The above embodiments have been described with reference to the example in which the anomaly detection ECU 400, 1400 transmits an anomaly detection message to the outside of the vehicle upon detecting an anomalous data frame is detected and detecting malfunction of the vehicle. However, if an anomalous data frame is detected with the transmission prevention function not activated, the anomaly detection ECU 400, 1400 may transmit, to an external apparatus, such as a server located outside the vehicle, information including, for example, the log information regarding the data frame detected as being anomalous, regardless of whether an anomaly, such as malfunction, has been detected. In the above-described frame transmission prevention apparatus 2400, if the frame received by the reception unit 2410 satisfies the predetermined condition, the communication unit 2440 may transmit analysis information including information regarding the frame to an external apparatus located outside the vehicle. In addition, if it is difficult for the anomaly detection ECU 400, 1400 to determine whether an anomaly has occurred, the anomaly detection ECU 400, 1400 may ask an external apparatus, such as the servers 500 and 1500, to determine whether the frame causes an anomaly. In the external apparatus, such as the server 500, the accuracy of determination can be increased on the basis of information collected from a plurality of vehicles. If the external apparatus determines that the frame causes an anomaly, the external apparatus can transmit, to the anomaly detection ECU 400, 1400, a message including activation instruction information for activating the transmission prevention function of the anomaly detection ECU 400, 1400 as needed. In addition, the above-described embodiments have been described with reference to the example in which, in the server 500, the analysis unit 520, the delivery message generation unit 540, and the like generate a delivery message including FW that changes the activation state of the transmission prevention function of the anomaly detection ECU 400 of the vehicle and in addition, in the server 1500, the analysis unit 1520, the message generation unit 1540, and the like generate a delivery message or a deactivation message for changing the activation state of the transmission prevention function of the anomaly detection ECU 1400 of the vehicle. Generation of the message transmitted by the server 500, 1500 may be performed on the basis of an instruction sent from an operator or the like to the server 500, 1500.

(4) The above embodiments have been described with reference to the example in which the anomaly detection ECU 400, 1400 updates the management information indicating the activation state of the transmission prevention function on the basis of the message transmitted from the server 500, 1500 or another vehicle. However, the anomaly detection ECU 400, 1400 may inspect whether an anomaly of the vehicle has occurred by itself when detecting an anomalous data frame. If, as a result of inspection, the occurrence of an anomaly is detected (for example, if malfunction is detected in step S1101), the anomaly detection ECU 400, 1400 may update the management information by itself so that the transmission prevention function is activated. As a particular example, the updating processing unit 460 of the anomaly detection ECU 400 may perform an updating process as follows. That is, in the case where a data frame received by the frame transceiver unit 110 satisfies a predetermined condition related to the anomaly detection rule stating that the ID is not included in the authorized ID list, and the flag information corresponding to the ID of the data frame in the management information indicates that prevention of transmission of the data frame is not permitted, if the occurrence of an anomaly is detected on the basis of a data frame that is received by the frame transceiver unit 110 and that has a specific ID different from the ID of the data frame, the flag information may be updated so as to indicate that prevention of transmission is permitted. For example, an anomaly can be detected by determining whether the reception interval, the reception frequency, or the content of the data frame, and the like of the data frame having the specific ID differs from that in the normal state. For example, an anomaly may be detected if a data frame having a specific ID has not been received even after a predetermined period of time. For example, it is useful to define the ID of an important data frame as the specific ID. In this manner, if an anomalous data frame is detected and an anomaly occurs in an important data frame, transmission of an anomalous data frame is thereafter prevented. As another particular example, in the case where the data frame received by the frame transceiver unit 110 satisfies a predetermined condition and the flag information indicates that prevention of transmission of the data frame is not permitted, if it is detected that a particular ECU is anomalous, the updating processing unit 460 may update the flag information so that the flag information indicates that prevention of transmission is permitted. For example, it is effective to define, as the above-described specific ECU, an ECU related to control of travelling, turning, or stopping of the vehicle, such as the engine ECU 100a or the brake ECU 100b. It is also effective to define, as the above-described specific ECU, a gateway ECU having a gateway function or a head unit ECU providing a user interface to the driver of the vehicle, for example. The anomaly of a specific ECU can be detected on the basis of the content of a frame transmitted by the specific ECU, a notification from a monitoring ECU that monitors the specific ECU, the result of measurement by a sensor related to an actuator to be controlled by the specific ECU, or the result of inspection through individual communication with the specific ECU. For example, if the measured value from the sensor of the engine speed rapidly increases beyond the normal range within a certain unit time, the anomaly of the engine ECU can be detected. For example, a sudden change in the acceleration of the vehicle may be detected as an anomaly of the engine ECU or the brake ECU. As a result, if an anomalous data frame is detected and an anomaly occurs in the ECU that has an influence on the travel of the vehicle, transmission of an anomalous data frame is thereafter prevented. In addition, even when a new authorized ECU is added to the in-vehicle network system and a data frame transmitted by the ECU is detected as being anomalous, transmission of the data frame is not prevented if any anomaly does not occur in the ECU having an influence on the travel of the vehicle. Thus, adverse effects caused by prevention of transmission are avoided. Furthermore, when the anomaly detection ECU 1400 transmits, to another vehicle, an anomaly notification message including the activation instruction information (step S2102), the anomaly detection ECU 1400 may update the management information about the vehicle including the anomaly detection ECU 1400 so that the transmission prevention function is activated. As a particular example, if the anomaly detection ECU 1400 determines that a data frame detected as being anomalous causes an anomaly in the vehicle, the anomaly detection ECU 1400 sets the flag information corresponding to the ID of the data frame so that the flag information indicates that the transmission prevention function is activated. Thus, transmission of a data frame having the ID is prevented by transmitting an error frame. Then, the anomaly detection ECU 1400 transmits, to other vehicles, a message including activation instruction information for permitting prevention of transmission of a data frame having the ID.

(5) While the above embodiments have been described with reference to the example in which the anomaly detection ECU 400, 1400 uses the authorized ID list related to the ID field to detect an anomalous data frame, the value in a field other than the ID field may be used. That is, in the frame transmission prevention apparatus, the ID is used as the predetermined condition for a frame for which transmission is prevented depending on the management information, a condition other than the condition related to the ID of the frame may be defined. For example, the predetermined condition may be a condition for DLC of a data frame serving as the frame or a condition for the data in the data field of a data frame. Alternatively, in the case where a message authentication code (MAC) is included in a frame exchanged between ECUs of the in-vehicle network system, the predetermined condition may be a condition that is satisfied when a frame does not include a proper MAC. For example, it can be determined whether a proper MAC is included in a frame by verifying the MAC, which is a data value located in a frame at a position prescribed in advance, by using a predetermined verification method and determining whether the verification is successful. Furthermore, the predetermined condition may be a condition relating to the cycle, frequency, and the like of the frame being transmitted.

(6) The above embodiments have been described with reference to the example in which the anomaly detection ECU 400, 1400 serving as frame transmission prevention apparatus detects that a frame is anomalous by using the anomaly detection rule and change the activation mode of the transmission prevention function of the frame detected as being anomalous by updating, for example, the FW. However, instead of changing the activation mode of the transmission prevention function, the anomaly detection rule may be changed by updating the FW. More specifically, at the time of shipment of the product, the anomaly detection ECU 400 may keep an anomaly detection rule stating that all of the IDs are considered as being not anomalous and set the transmission prevention function in an activation mode. Thereafter, the anomaly detection rule may be changed by updating the FW so that transmission of an anomalous frame is prevented.

(7) The above embodiments have been described with reference to the following example. That is, the log information about the data frame detected as being anomalous and included in the anomaly detection message transmitted to the server 500 by the anomaly detection ECU 400 includes, for example, log data of data frames that flow in the bus 200 for a predetermined period of time after detection of the data frame. In addition, the server 500 analyzes the log information and determines whether the data frame is an anomalous data frame that causes an anomaly in the in-vehicle network system 10, such as malfunction of the vehicle. However, instead of the information obtained for a predetermined period of time after detection of an anomalous data frame, the anomaly detection ECU 400 may allow the following information to be included in the log information: the content and the reception times of a variety of data frames received from the bus 200 for a predetermined period of time before the detection or before and after the detection. In addition, the anomaly detection ECU 400 may determine whether the data frame detected as being anomalous causes an anomaly on the basis of data frames received from the bus 200 for a predetermined period of time before detection of the anomalous data frame or during a predetermined period of period of time before and after the detection. If an anomaly is caused, the anomaly detection ECU 400 may activate the transmission prevention function for the data frame detected as being anomalous.

(8) According to the second embodiment, the anomaly detection ECU 1400 determines whether the vehicle type information indicates the same type of vehicle as the vehicle having the anomaly detection ECU 1400 mounted therein. This is an example of determining whether to activate the transmission prevention function by determining the commonality between the vehicle in which the anomaly occurs and the vehicle having the anomaly detection ECU 1400 mounted therein. Instead of using the vehicle type information, the commonality may be determined by using information such as the model year, the model, or the manufacturer of the vehicle.

(9) While the second embodiment above has been described with reference to the example in which a target frame is identified by using an ID and an instruction to activate or deactivate the transmission prevention function is sent for the target frame, an instruction to activate or deactivate the transmission prevention function may be sent for all of the frames in one go. In addition, the technique for identifying the target frame is not limited to the technique using the ID. For example, a target frame may be identified by using a bit string or the like located in the frame at a specific position. In addition, the activation instruction information or the deactivation instruction information may be indicated by FW, and the activation mode of the transmission prevention function may be changed by updating the FW of the anomaly detection ECU. Furthermore, the management information does not necessarily have to consist of flag information for each of the IDs. The management information may consist of only one flag indicating whether prevention of transmission of all data frames detected as being anomalous is permitted.

(10) The constituent elements of the frame transmission prevention apparatus of each of the embodiments or modifications described above may be distributedly provided in a plurality of apparatuses, such as a plurality of ECUs, connected to the bus 200. In addition, instead of referring to the management information held in the frame transmission prevention apparatus, the frame transmission prevention apparatus may refer to management information obtained from the outside of the apparatus and switch whether to perform a predetermined process for preventing transmission of a frame detected as being anomalous (e.g., a process of transmitting an error frame). In this case, the frame transmission prevention apparatus may refer to the management information indicating whether to permit prevention of transmission of a frame detected as being anomalous by reading the information stored in the hard disk or other recording medium, by reading the state of switches or other hardware, or by receiving information from the outside.

(11) While the above embodiments have been described with reference to data frames transmitted over the in-vehicle network in accordance with the CAN protocol, the CAN protocol may be replaced by one of derivatives of the CAN protocol, such as CANOpen used in, for example, an embedded system in an automation system, TTCAN (Time-Triggered CAN), or CANFD (CAN with Flexible Data Rate). Alternatively, the in-vehicle network may use a protocol other than the CAN protocol. To transmit frames in an in-vehicle network and control a vehicle, one of the following protocols may be used: LIN (Local Interconnect Network), MOST (registered trademark) (Media Oriented Systems Transport), FlexRay (registered trademark), and Ethernet (registered trademark). Still alternatively, networks employing these protocols may be used as sub-networks, and the sub-networks related to plural types of protocols may be combined to form an in-vehicle network. In addition, the Ethernet (registered trademark) protocol may be replaced by one of the following derivatives thereof: Ethernet (registered trademark) AVB (Audio Video Bridging) according to IEEE 802.1, Ethernet (registered trademark) TSN (Time Sensitive Networking) according to IEEE 802.1, Ethernet (registered trademark)/IP (Industrial Protocol), EtherCAT (registered trademark) (Ethernet (registered trademark) for Control Automation Technology), and the like. Note that the network bus of the in-vehicle network may be a wired communication path over, for example, a wire, an optical fiber, or the like. For example, the frame transmission prevention apparatus 2400 may be connected to the network bus via a network system in which the ECUs communicate with one another by using one of the above-mentioned protocols and may receive a frame. If the received frame satisfies a predetermined condition, the frame transmission prevention apparatus 2400 may switch whether to perform a predetermined process for preventing transmission of the frame on the basis of the management information indicating whether prevention of transmission of a frame is permitted.

(12) While the above embodiments have been described with reference to data frames having the standard format of the CAN protocol, the data frames may have an extended ID format. In addition, the ID of the data frame may be an extended ID of the extended ID format or the like. Furthermore, the above-described data frame may be one type of frame in a network that employs a protocol other than the CAN. In this case, an ID for identifying the type of frame or the like corresponds to the ID of the data frame.

(13) While the above embodiments have been described with reference to the example in which the frame transmission prevention apparatus is mounted in the vehicle and is included in the in-vehicle network system performing communication for controlling the vehicle, the frame transmission prevention apparatus may be included in a network system for controlling an object to be controlled other than a vehicle. Examples of an object to be controlled other than a vehicle include a robot, an aircraft, a boat, and a machine.

(14) Each of the apparatuses described in the above embodiment, such as the ECUs, may include a hard disk unit, a display unit, a keyboard, and a mouse in addition to a memory, a processor, and the like. Alternatively, each of the apparatuses described in the above embodiments, such as the ECUs, may provide its function by software-wise implementation in which programs stored in the memory are executed by the processor. Still alternatively, each of the apparatuses described in the above embodiments may provide its function by dedicated hardware (e.g., a digital circuit) without using a program. Note that allocation of the functions to the constituent elements of each of the apparatuses can be changed as appropriate.

(15) Some or all of the constituent elements that constitute each of the apparatuses according to the above embodiments may be composed of a single system LSI (Large Scale Integration). The system LSI is a super multifunctional LSI produced by integrating a plurality of constituent parts on one chip. More specifically, a system LSI is a computer system including, for example, a microprocessor, a ROM, and a RAM. The RAM has a computer program stored therein. The microprocessor operates in accordance with the computer program, so that the system LSI achieves the function thereof. Alternatively, the constituent elements that constitute each of the apparatuses described above may be provided as individual chips, or some or all of the constituent elements may be integrated into a single chip. Although the term "system LSI" is used herein, the term "system LSI" is also referred to as an "IC", an "LSI", a "super LSI" or an "ultra LSI", depending on the level of integration. In addition, the circuit integration is not limited to LSI and may be achieved by dedicated circuitry or a general-purpose processor. An FPGA (Field Programmable Gate Array), which is programmable after fabrication of the LSI, or a reconfigurable processor which allows reconfiguration of connections and settings of circuit cells in LSI may be used. Moreover, should a circuit integration technology replacing LSI appear as a result of advancements in semiconductor technology or other technologies derived from the technology, the functional blocks could be integrated by using such a technology. Another possibility is the application of biotechnology, for example.

(16) Some or all of the constituent elements that constitute each of the above-described apparatuses may be composed of an IC card or a single module removable from the apparatus. The IC card or the module is a computer system including a microprocessor, a ROM, a RAM and the like. The IC card or the module may include the above-described super multifunction LSI. The microprocessor operates in accordance with the computer program, so that the IC card or the module achieves the function thereof. The IC card or the module may be tamper resistant.

(17) According to an aspect of the present disclosure, a frame transmission prevention method including all or part of the processing procedure illustrated in FIGS. 14, 15, 17, 22, 23, 26, 27, and 29 may be provided. For example, the frame transmission prevention method is used in a network system including a plurality of ECUs that communicate with one another via a bus. The method includes a reception step of receiving a frame from the bus (for example, step S1002) and a processing step of, if the frame received in the reception step satisfies a predetermined condition, switching whether to perform a predetermined process to prevent transmission of the frame on the basis of management information indicating whether prevention of transmission of a frame is permitted (for example, steps S1006 to S1008). According to another aspect of the present disclosure, a program (a computer program) that implements the method by a computer may be provided, or a digital signal including the computer program may be provided. According to still another aspect of the present disclosure, a computer-readable recording medium that stores the computer program or the digital signal may be provided. Examples of the recording medium include a flexible disk, a hard disk, a CD-ROM, an MO, a DVD, a DVD-ROM, a DVD-RAM, a BD (Blu-ray (registered trademark) Disc), and a semiconductor memory. Furthermore, the digital signal stored in the recording medium may be provided. According to yet still another aspect of the present disclosure, the above-described computer program or digital signal transmitted via an electric communication line, a wireless or wired communication line, a network represented by the Internet, data broadcast, or the like may be provided. According to yet still another aspect of the present disclosure, a computer system including a microprocessor and a memory may be provided. The memory may store the above-described computer program, and the microprocessor may operate in accordance with the computer program. In addition, the above-described program or digital signal may be recorded on the recording medium and may be transferred into another independent computer system, or the program or the digital signal may be transferred into the independent computer system via a network or the like. Thus, the program or the digital signals may be executed by the independent computer system.

(18) An embodiment achieved by combining the constituent elements and functions described in the above embodiments and modifications in any way is also encompassed within the scope of the present disclosure.

The present disclosure can be used to prevent transmission of an anomalous frame to a network, such as an in-vehicle network.

What is claimed is:

1. A frame transmission prevention apparatus connected to a network of a network system including a plurality of electronic control units communicating with one another via the network, comprising:
  a processor; and
  a memory including at least one set of instructions that causes the processor to perform operations when executed by the processor, the operations including:
  receiving a first frame from the network,
  switching whether to perform a first process for preventing transmission of the first frame on the basis of management information stored in the memory, the management information indicating whether prevention of transmission of a frame is permitted if the first frame satisfies a first condition, wherein the management information includes a plurality of flags each corresponding to one of a plurality of IDs, the first frame has a first ID, and a first flag corresponding to the first ID indicates whether prevention of transmission of the first frame is permitted, and
  updating the management information stored in the memory so that the first process is performed if the first frame satisfies the first condition and if the first flag indicates that prevention of transmission of the first frame is permitted, and the first process is not performed if the first frame satisfies the first condition and if the first flag indicates that prevention of transmission of the first frame is not permitted.

2. The frame transmission prevention apparatus according to claim 1, wherein the plurality of electronic control units communicate with one another via the network in accordance with a controller area network protocol, and
  wherein the first process includes a process of transmitting an error frame to the network before a rearmost bit of the first frame is received by the processor.

3. The frame transmission prevention apparatus according to claim 1, wherein the plurality of flags indicate that prevention of transmission of a frame is not permitted if the management information has never been updated.

4. The frame transmission prevention apparatus according to claim 1, wherein the first flag is 1-bit information.

5. The frame transmission prevention apparatus according to claim 1, wherein the updating includes updating the management information in accordance with instruction information externally received by the frame transmission prevention apparatus.

6. The frame transmission prevention apparatus according to claim 5, wherein the network system is an in-vehicle network system,
  wherein the plurality of electronic control units, the network, and the frame transmission prevention apparatus are mounted in a vehicle, and
  wherein the updating includes updating the management information in accordance with the instruction information transmitted by an external apparatus located outside the vehicle.

7. The frame transmission prevention apparatus according to claim 6, wherein the updating includes:
  updating the flag corresponding to a second ID in the management information if the instruction information transmitted by the external apparatus indicates an instruction not to permit prevention of transmission of a second frame having the second ID under the condition that authentication as to whether the external apparatus has predetermined authority is successful, and
  updating the flag corresponding to the second ID so that prevention of transmission of the second frame having the second ID is permitted if the instruction information indicates an instruction to permit prevention of transmission of the second frame having the second ID, regardless of whether the external apparatus has the predetermined authority.

8. The frame transmission prevention apparatus according to claim 7, wherein the operations further include transmitting, to another vehicle, second instruction information to permit prevention of transmission of the first frame having the first ID when the first process is performed.

9. The frame transmission prevention apparatus according to claim 6, wherein the operations further include transmitting, to the external apparatus, information for analysis including information regarding the first frame if the first frame satisfies the first condition.

10. The frame transmission prevention apparatus according to claim 1, wherein the updating includes updating the first flag so that in the case where the first frame satisfies the first condition and the first flag corresponding to the first ID of the first frame indicates that prevention of transmission of the first frame is not permitted, the prevention is permitted if the occurrence of anomaly is detected on the basis of a second frame having a second ID different from the first ID.

11. The frame transmission prevention apparatus according to claim 1, wherein the updating includes updating the first flag so that in the case where the first frame satisfies the first condition and the first flag corresponding to the first ID of the first frame indicates that prevention of transmission of the first frame is not permitted, and
  wherein the prevention is permitted if it is detected that a predetermined particular electronic control unit among the plurality of electronic control units is anomalous.

12. The frame transmission prevention apparatus according to claim 1, wherein the first condition includes a condition related to the first ID of a frame, and
  wherein if the first ID of the first frame satisfies the first condition, the switching switches whether to perform the first process on the basis of the management information.

13. The frame transmission prevention apparatus according to claim 1, wherein the plurality of electronic control units communicate with one another via the network in accordance with a controller area network protocol, wherein the first condition includes a condition related to Data Length Code (DLC) of a data frame representing a frame, and wherein if the DLC of the first frame satisfies the first condition, the switching switches whether to perform the first process on the basis of the management information.

14. The frame transmission prevention apparatus according to claim 1, wherein the plurality of electronic control units communicate with one another via the network in accordance with a controller area network protocol, wherein the first condition is a condition related to data in a data field of a data frame representing a frame, and wherein if the data in the data field of the first frame satisfies the first condition, the switching switches whether to perform the first process on the basis of the management information.

15. The frame transmission prevention apparatus according to claim 1, wherein the first condition includes a condition that is satisfied if a frame does not include a proper message authentication code.

16. The frame transmission prevention apparatus according to claim 1, wherein the plurality of electronic control units communicate with one another via the network in accordance with a controller area network protocol, and wherein the first process includes a process of transmitting a dominant signal to the network while the first frame is being transmitted.

17. A frame transmission prevention method for use of a network system including a plurality of electronic control units communicating with one another via a network, the method comprising:

receiving a first frame from the network;

switching whether to perform a first process for preventing transmission of the first frame if the first frame satisfies a first condition on the basis of management information indicating whether prevention of transmission of a frame is permitted, wherein the management information includes a plurality of flags each corresponding to one of a plurality of IDs, the first frame has a first ID, and a first flag corresponding to the first ID indicates whether prevention of transmission of the first frame is permitted; and updating the management information stored in the memory so that the first process is performed if the first frame satisfies the first condition and if the first flag indicates that prevention of transmission of the first frame is permitted, and the first process is not performed if the first frame satisfies the first condition and if the first flag indicates that prevention of transmission of the first frame is not permitted.

18. An in-vehicle network system including a plurality of electronic control units communicating with one another via a network, the system comprising:

a processor; and a memory including at least one set of instructions that causes the processor to perform operations when executed by the processor, the operations including:

receiving a first frame from the network, switching whether to perform a first process of preventing transmission of the first frame on the basis of management information stored in the memory, the management information indicating whether prevention of transmission of a frame is permitted if the first frame satisfies a first condition, wherein the management information includes a plurality of flags each corresponding to one of a plurality of IDs, the first frame has a first ID, and a first flag corresponding to the first ID indicates whether prevention of transmission of the first frame is permitted, and updating the management information stored in the memory so that the first process is performed if the first frame satisfies the first condition and if the first flag indicates that prevention of transmission of the first frame is permitted, and the first process is not performed if the first frame satisfies the first condition and if the first flag indicates that prevention of transmission of the first frame is not permitted.

* * * * *